US012600156B2

(12) United States Patent
Okayama

(10) Patent No.: US 12,600,156 B2
(45) Date of Patent: Apr. 14, 2026

(54) IMAGE FORMING APPARATUS AND METHOD OF MANUFACTURING PRINTED MATERIAL

(71) Applicant: FUJIFILM Corporation, Tokyo (JP)

(72) Inventor: Yoshiyuki Okayama, Kanagawa (JP)

( * ) Notice: Subject to any disclaimer, the term of this patent is extended or adjusted under 35 U.S.C. 154(b) by 165 days.

(21) Appl. No.: 18/313,359

(22) Filed: May 7, 2023

(65) Prior Publication Data

US 2023/0271441 A1 Aug. 31, 2023

Related U.S. Application Data

(63) Continuation of application No. PCT/JP2021/041845, filed on Nov. 15, 2021.

(30) Foreign Application Priority Data

Nov. 20, 2020 (JP) ................................ 2020-193048

(51) Int. Cl.
*B41M 5/00* (2006.01)
*B41J 11/00* (2006.01)

(52) U.S. Cl.
CPC .......... *B41M 5/0017* (2013.01); *B41J 11/002* (2013.01)

(58) Field of Classification Search
CPC .. B41M 5/0017; B41J 11/002; B41J 2202/12; B41J 2/155; B41J 2/161; B41J 2202/20; B41J 11/0015; B41J 13/0018
See application file for complete search history.

(56) References Cited

U.S. PATENT DOCUMENTS 5,214,442 A * 5/1993 Roller .................... B41J 11/002 346/25
5,959,641 A 9/1999 Yokoi
9,505,234 B2 11/2016 Bannai et al.
(Continued)

FOREIGN PATENT DOCUMENTS

EP 1208989 A2 * 5/2002 .......... B41J 2/04533
JP H0527010 2/1993
(Continued)

OTHER PUBLICATIONS

"Search Report of Europe Counterpart Application", issued on Apr. 18, 2024, p. 1-p. 10.
(Continued)

*Primary Examiner* — Justin Seo
(74) *Attorney, Agent, or Firm* — JCIPRNET

(57) ABSTRACT

The image forming apparatus 1 includes: a transport mechanism 11 that transports a recording medium P; a coating device 24 that coats the recording medium P with a pretreatment liquid; an ink jet head 46; and a processor 300, in which the processor 300 is configured to, in a case where the recording medium P is transported at a first transportation speed and an ink is jetted from the ink jet head 46 to form an image on the recording medium P, perform control to cause the coating device 24 to perform coating with the pretreatment liquid, and in a case where the recording medium P is transported at a second transportation speed faster than the first transportation speed to form the image on the recording medium P, perform control to cause the coating device 24 not to perform coating with the pretreatment liquid.

19 Claims, 10 Drawing Sheets

(56) References Cited

U.S. PATENT DOCUMENTS

| | | | |
|---|---|---|---|
| 10,556,449 | B2 | 2/2020 | Nakai et al. |
| 2008/0001983 | A1 | 1/2008 | Kawakami et al. |
| 2009/0244237 | A1 | 10/2009 | Kachi |
| 2013/0257959 | A1 | 10/2013 | Itogawa |
| 2014/0292855 | A1 | 10/2014 | Chang |
| 2016/0307078 | A1 | 10/2016 | Akazawa et al. |
| 2017/0106668 | A1 | 4/2017 | Evers et al. |
| 2020/0282749 | A1 | 9/2020 | Imamura et al. |

FOREIGN PATENT DOCUMENTS

| | | |
|---|---|---|
| JP | H05270100 A | * 10/1993 |
| JP | H0872229 | 3/1996 |
| JP | 2001001509 | 1/2001 |
| JP | 2002096452 | 4/2002 |
| JP | 2002137378 | 5/2002 |
| JP | 2002210947 | 7/2002 |
| JP | 2006341947 | 12/2006 |
| JP | 2007111941 | 5/2007 |
| JP | 2008006734 | 1/2008 |
| JP | 2011173320 | 9/2011 |
| JP | 2014148159 | 8/2014 |
| JP | 6471791 | 2/2019 |
| JP | 2019064135 | 4/2019 |
| WO | 2018225489 | 12/2018 |

OTHER PUBLICATIONS

"International Search Report (Form PCT/ISA/210) of PCT/JP2021/041845", mailed on Dec. 7, 2021, with English translation thereof, pp. 1-5.

"Written Opinion of the International Searching Authority (Form PCT/ISA/237) of PCT/JP2021/041845", mailed on Dec. 7, 2021, with English translation thereof, pp. 1-8.

"Office Action of Japan Counterpart Application", issued on May 29, 2025, with English translation thereof, p. 1-p. 36.

"Office Action of Japan Counterpart Application", issued on Jul. 31, 2025, with English translation thereof, p. 1-p. 17.

* cited by examiner

FIG. 4

| | STANDARD MODE (TWO-LIQUID COAGULATION SYSTEM) | HIGH-SPEED MODE (ONE-LIQUID COAGULATION SYSTEM) |
|---|---|---|
| PRINTING RESOLUTION | 1200dpi × 1200dpi | 1200dpi × 600dpi |
| MAXIMUM JETTED INK DROPLET VOLUME | 4.5pl TO 5.5pl | 2.5pl TO 3.5 pl |
| DRYING INTENSITY | STANDARD DRYING | DRYING INTENSITY UP |

FIG. 5

| TYPE OF PAPER | PAPER THICKNESS (mm) | RECOMMENDED PRINTING CONDITION STANDARD MODE | | RECOMMENDED PRINTING CONDITION HIGH-SPEED MODE | |
|---|---|---|---|---|---|
| | | HOT AIR TEMPERATURE (°C) | BELT TEMPERATURE (°C) | HOT AIR TEMPERATURE (°C) | BELT TEMPERATURE (°C) |
| GLOSS | TO 0.07 | 95 | 85 | 100 | 90 |
| | 0.08 TO 0.09 | 100 | 90 | 105 | 95 |
| | 0.10 TO 0.12 | 110 | 100 | 120 | 110 |
| | 0.13 TO 0.19 | 115 | 105 | 125 | 115 |
| | 0.20 TO 0.60 | 150 | 120 | 170 | 140 |

| TRANSPORTATION SPEED | DRYING INTENSITY | |
|---|---|---|
| | STANDARD (150°C/120°C) | UP (170°C/140°C) |
| 3600 sph | A | A+ |
| 5400 sph | C | A |
| 7200 sph | D | A |

| TRANSPORTATION SPEED | DRYING INTENSITY | |
|---|---|---|
| | STANDARD (100°C/90°C) | UP (110°C/100°C) |
| 3600 sph | A | A+ |
| 5400 sph | A | A+ |
| 7200 sph | B | A |

IMAGE FORMING APPARATUS AND METHOD OF MANUFACTURING PRINTED MATERIAL

CROSS-REFERENCE TO RELATED APPLICATIONS

The present application is a Continuation of PCT International Application No. PCT/JP2021/041845 filed on Nov. 15, 2021 claiming priority under 35 U.S.C § 119(a) to Japanese Patent Application No. 2020-193048 filed on Nov. 20, 2020. Each of the above applications is hereby expressly incorporated by reference, in its entirety, into the present application.

BACKGROUND OF THE INVENTION

1. Field of the Invention

The present invention relates to an image forming apparatus and a method of manufacturing a printed material, and more particularly to an image forming technique using an ink jet method.

2. Description of the Related Art

JP2007-111941A describes an image forming apparatus including a pretreatment liquid coating device by which a recording medium is coated with a pretreatment liquid, and a printing head that jets ink to the recording medium coated with the pretreatment liquid. This image forming apparatus includes a unit for controlling the amount of the pretreatment liquid based on a transportation speed of the recording medium for the purpose of forming an image having a high image density and no bleeding overflow without image density unevenness even on a recording medium without an ink receiving layer, such as industrial printing paper. An amount of the pretreatment liquid is reduced when the transportation speed is fast, and the amount of the pretreatment liquid is increased when the transportation speed is slow to coat the recording medium with the pretreatment liquid.

In JP2002-137378A, focusing on the fact that there are types of paper that need to be coated with a pretreatment liquid and types of paper that do not need to be coated with a pretreatment liquid depending on the types of paper, a configuration is proposed in which a coating step path on which paper is coated with a pretreatment liquid and a coating unnecessity path on which coating with the pretreatment liquid is not performed are provided in an image forming apparatus, a transport path of the paper is switched based on a detection result of paper type, and the paper that does not require pretreatment coating is allowed to pass through the coating unnecessity path.

An image forming apparatus described in JP6471791B includes a unit for controlling an amount of a pretreatment liquid to be applied to a surface of a recording medium according to a transportation speed, for the purpose of improving scratch resistance of the recording medium on which an image is formed, in which the amount of the pretreatment liquid is increased as the transportation speed is increased.

SUMMARY OF THE INVENTION

As described in JP2007-111941A, JP2002-137378A, and JP6471791B, in the field of ink jet printing, a technique is known that realizes high image quality printing in which ink is jetted after transported paper is coated with a pretreatment liquid to coagulate a coloring material. A printing method that utilizes such a two-liquid coagulation reaction is referred to as a “two-liquid coagulation system”. On the other hand, a printing method in which ink is jetted without coating with a pretreatment liquid is referred to as a “one-liquid coagulation system”.

Although an ink jet printing apparatus of the two-liquid coagulation system can produce a printed material having high image quality, the ink jet printing apparatus cannot sufficiently meet the demand of a user for a further increase in productivity in terms of printing speed. In order to improve the productivity, it is necessary to increase a paper transportation speed, and high-speed coating needs to be performed in the coating step of the pretreatment liquid. In a case where a roller coating method is adopted in the coating step of the pretreatment liquid, there is a limit in the transportation speed for performing stable coating, so that there is a problem that it is difficult to further increase the transportation speed.

In addition, since a drying time after printing is shortened due to the increase in the paper transportation speed, a film strength of a printed surface decreases, so that a problem of film quality such as blocking is incurred, or a problem such as curling and/or cockling due to insufficient drying is incurred.

The present invention has been made in view of such circumstances, and an object thereof is to provide an image forming apparatus and a method of manufacturing a printed material capable of solving at least one of a plurality of the problems described above and meeting user requirements for both high image quality printing and high productivity printing.

An image forming apparatus according to an aspect of the present disclosure includes: a transport mechanism that transports a recording medium; a coating device that coats the recording medium with a pretreatment liquid; an ink jet head that jets an ink; and a processor that controls a transportation speed of the recording medium and a coating operation by the coating device in a case where an image is formed on the recording medium by jetting the ink from the ink jet head, in which the processor is configured to: in a case where the recording medium is transported at a first transportation speed to form the image on the recording medium, perform control to cause the coating device to perform coating with the pretreatment liquid, and in a case where the recording medium is transported at a second transportation speed faster than the first transportation speed to form the image on the recording medium, perform control to cause the coating device not to perform coating with the pretreatment liquid.

According to this aspect, the transportation speed of the recording medium can be changed, and whether or not coating with the pretreatment liquid is performed (whether or not coating is performed) is controlled according to a change in the transportation speed. In the case where the recording medium is transported at the first transportation speed to form the image, an apparatus configuration is of a two-liquid coagulation system in which coating with the pretreatment liquid is performed. On the other hand, in the case where the recording medium is transported at the second transportation speed higher than the first transportation speed to form the image, the apparatus configuration may be of a one-liquid coagulation system in which coating with the pretreatment liquid is not performed.

Accordingly, it is possible to use one image forming apparatus for both applications of high image quality printing using the two-liquid coagulation system and high productivity printing using the one-liquid coagulation system. The first transportation speed and the second transportation speed may be predetermined speeds or may be speeds designated by a user. The "transportation speed" includes the concept of printing speed. The transportation speed may be represented by the number of printed sheets per unit time, or may be represented by a movement distance per unit time.

In the image forming apparatus according to another aspect of the present disclosure, the processor may be configured to: receive an input of an instruction to switch between a first mode in which the recording medium is transported at the first transportation speed and a second mode in which the recording medium is transported at the second transportation speed; and perform control such that coating with the pretreatment liquid is performed in a case where the first mode is designated and perform control such that coating with the pretreatment liquid is not performed in a case where the second mode is designated.

The image forming apparatus according to another aspect of the present disclosure may further include: a drying device that dries the ink adhered to the recording medium, in which the processor is configured to control the drying device to a first drying intensity in the case where the recording medium is transported at the first transportation speed, and to control the drying device to a second drying intensity higher than the first drying intensity in the case where the recording medium is transported at the second transportation speed.

According to this aspect, it is possible to suppress insufficient drying due to shortening of a drying time accompanying an increase in the transportation speed.

In the image forming apparatus according to another aspect of the present disclosure, the processor may be configured to set a drying intensity of the drying device according to a thickness of the recording medium. According to this aspect, it is possible to perform an appropriate drying treatment according to the thickness of the recording medium to be used. The processor may be configured to set the drying device to a higher temperature as the thickness of the recording medium increases.

In the image forming apparatus according to another aspect of the present disclosure, the processor may be configured to set a drying intensity of the drying device according to a type of the recording medium. According to this aspect, it is possible to perform an appropriate drying treatment according to the type of the recording medium to be used. It is preferable that the processor is configured to set the drying intensity of the drying device based on a combination of the type and the thickness of the recording medium.

In the image forming apparatus according to another aspect of the present disclosure, the processor may be configured to set a drying intensity of the drying device based on a content of the image formed on the recording medium. Since the amount of ink applied to the recording medium varies depending on the content of the image, it is preferable to adjust drying conditions according to the content of the image.

The image forming apparatus according to another aspect of the present disclosure may further include: an input device via which a drying condition of the drying device is designated, in which the processor may be configured to control the drying device according to the drying condition input via the input device. According to this aspect, the user can manually change the drying conditions via the input device.

In the image forming apparatus according to another aspect of the present disclosure, the processor may be configured to: in the case where the recording medium is transported at the first transportation speed, cause the ink jet head to form the image on the recording medium at a first printing resolution; and in the case where the recording medium is transported at the second transportation speed, cause the ink jet head to form the image on the recording medium at a second printing resolution lower than the first printing resolution.

By causing the printing resolution to be a low printing resolution, the amount of ink applied to the recording medium can be reduced. Accordingly, it is possible to suppress an increase in the drying intensity required for the transportation at the second transportation speed.

In the image forming apparatus according to another aspect of the present disclosure, the processor may be configured to: in the case where the recording medium is transported at the first transportation speed to form the image, set a maximum jetted ink droplet volume per dot of the ink jetted from a nozzle of the ink jet head to a first droplet volume; and in the case where the recording medium is transported at the second transportation speed to form the image, set the maximum jetted ink droplet volume to a second droplet volume smaller than the first droplet volume.

By reducing the maximum jetted ink droplet volume, the amount of ink applied to the recording medium can be reduced. Accordingly, it is possible to suppress an increase in the drying intensity required for the transportation at the second transportation speed.

In the image forming apparatus according to another aspect of the present disclosure, the coating device may include a coating roller that transfers the pretreatment liquid onto the recording medium, and the coating roller may be brought into a state of being separated from the recording medium so that coating with the pretreatment liquid is not performed.

In the image forming apparatus according to another aspect of the present disclosure, the pretreatment liquid may contain an acid.

In the image forming apparatus according to another aspect of the present disclosure, the pretreatment liquid may contain at least one of a polyvalent metal salt or a cationic polymer.

In the image forming apparatus according to another aspect of the present disclosure, the ink jet head may be a line head.

In the image forming apparatus according to another aspect of the present disclosure, the same ink may be used in the case where the recording medium is transported at the first transportation speed to form the image on the recording medium and in the case where the recording medium is transported at the second transportation speed to form the image on the recording medium.

In the image forming apparatus according to another aspect of the present disclosure, the second transportation speed may be 1.2 times or more the first transportation speed.

A method of manufacturing a printed material according to another aspect of the present disclosure is a method of manufacturing a printed material using an image forming apparatus including a transport mechanism that transports a recording medium, a coating device that coats the recording medium with a pretreatment liquid, an ink jet head that jets an ink, and a processor that controls a transportation speed of the recording medium and a coating operation by the coating device in a case where an image is formed on the recording medium by jetting the ink from the ink jet head, the method including: receiving an input of an instruction to change the transportation speed by the processor; in a case in which a first transportation speed is designated as the transportation speed, transporting the recording medium at the first transportation speed by the transport mechanism, coating the recording medium with the pretreatment liquid by the coating device, and allowing the ink jetted from the ink jet head to adhere to the recording medium coated with the pretreatment liquid to form the image on the recording medium; and in a case where a second transportation speed higher than the first transportation speed is designated as the transportation speed, transporting the recording medium at the second transportation speed by the transport mechanism, not coating the recording medium with the pretreatment liquid by the coating device, and allowing the ink jetted from the ink jet head to adhere to the recording medium not coated with the pretreatment liquid to form the image on the recording medium.

According to the present invention, it is possible to provide an image forming apparatus that can be used for both applications of high image quality printing and high productivity printing in which productivity is emphasized. In addition, according to the present invention, it is possible to perform printing by switching between high image quality printing and high productivity printing according to an application, and it is possible to respond to not only manufacturing of a printed material in which image quality is emphasized but also manufacturing of a printed material in which productivity is emphasized.

BRIEF DESCRIPTION OF THE DRAWINGS

FIG. 4 is a table showing an example of a combination of settings of a printing resolution, a maximum jetted ink droplet volume, and a drying intensity corresponding to each of a standard mode and a high-speed mode.

FIG. 5 is a table showing a setting example of a drying condition table.

DESCRIPTION OF THE PREFERRED EMBODIMENTS

Hereinafter, preferred embodiments of the present invention will be described in detail with reference to the accompanying drawings.

<<Configuration of Ink Jet Printing Apparatus>>

Figure 1:
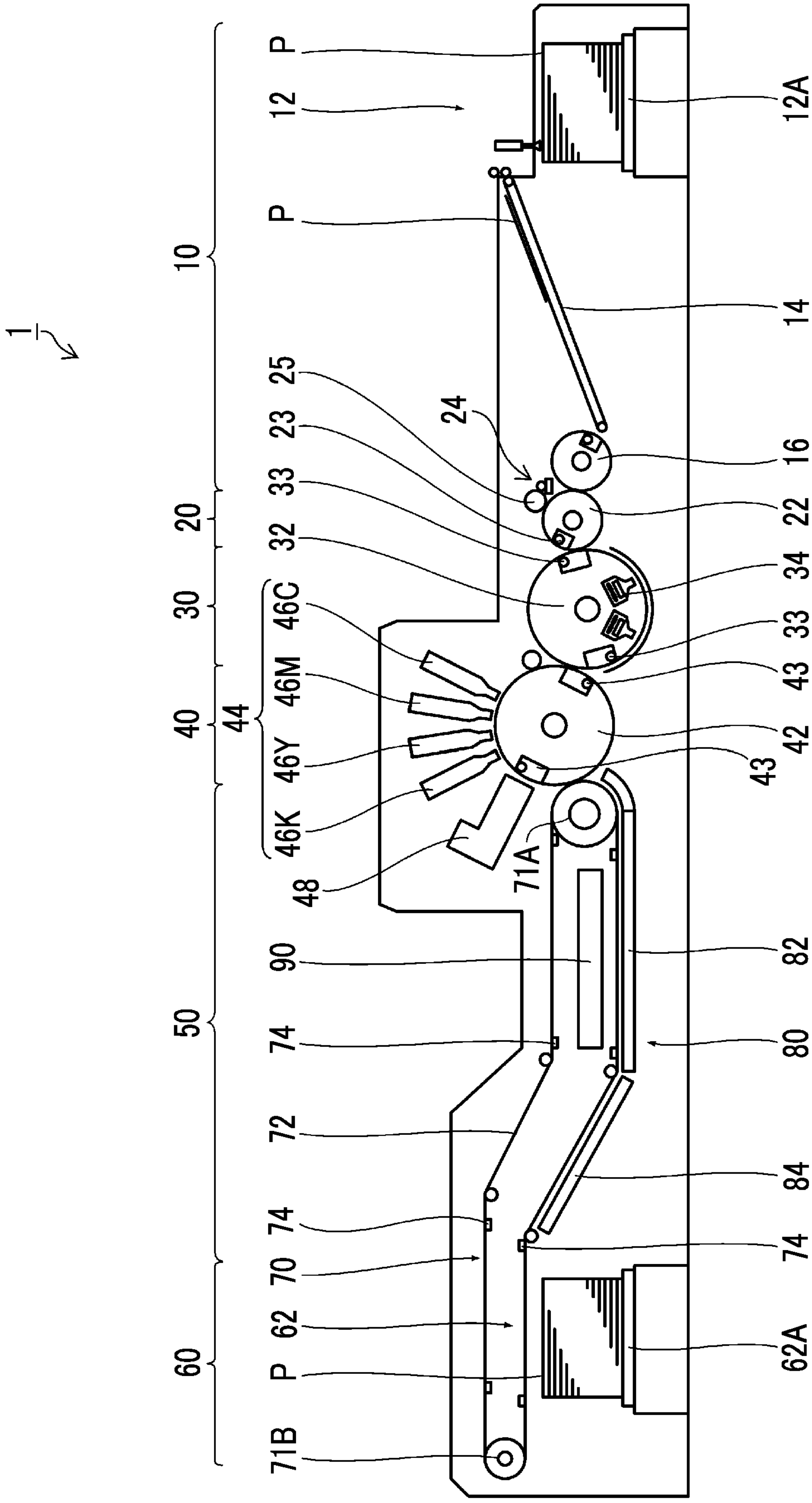
FIG. 1 is an overall configuration diagram of an ink jet printing apparatus according to an embodiment of the present invention.

FIG. 1 is an overall configuration diagram of an ink jet printing apparatus 1 according to an embodiment of the present invention. The ink jet printing apparatus 1 is an ink jet type color digital printing apparatus that prints a desired image on sheet-fed paper P in a single-pass method using four color inks of cyan (C), magenta (M), yellow (Y), and black (K). The ink jet printing apparatus 1 is an example of an "image forming apparatus" in the present disclosure. In the present embodiment, an example in which an aqueous ink is used as an ink for drawing will be described. The aqueous ink refers to an ink obtained by dissolving or dispersing a coloring material such as a pigment or a dye in water and/or a water-soluble solvent.

The ink jet printing apparatus 1 includes a feeding unit 10, a treatment liquid applying unit 20, a treatment liquid drying unit 30, a drawing unit 40, an ink drying unit 50, and an accumulation unit 60.

The feeding unit 10 includes a feeding device 12, a feeder board 14, and a feeding drum 16. The paper P is placed on a feeding tray 12A in a state of a bundle in which a large number of sheets are stacked. The type of the paper P is not particularly limited, and for example, printing paper primarily containing cellulose, such as woodfree paper, coated paper, and art paper, can be used. A maximum paper size that can be used in the ink jet printing apparatus 1 is, for example, 750 mm×585 mm.

The feeding device 12 takes out the bundled sheets of paper P set in the feeding tray 12A one by one in order from the top and supplies the paper P to the feeder board 14. The feeder board 14 transports the paper P received from the feeding device 12 to the feeding drum 16.

The feeding drum 16 receives the paper P fed from the feeder board 14, and transports the received paper P to the treatment liquid applying unit 20.

The paper P is coated with the treatment liquid by the treatment liquid applying unit 20. The term "treatment liquid" is synonymous with a "pretreatment liquid". There are cases where the treatment liquid is referred to as a "precoat", a "preconditioner", an "undercoat liquid", a "treatment agent", or the like. The treatment liquid is a liquid having a function of allowing coloring material components in the ink to coagulate, insolubilize, or thicken. The treatment liquid applying unit 20 includes a treatment liquid coating drum 22 and a treatment liquid coating device 24.

The treatment liquid coating drum 22 receives the paper P from the feeding drum 16 and transports the received paper P to the treatment liquid drying unit 30. The treatment liquid coating drum 22 is provided with a gripper 23 on a peripheral surface of the drum, and by gripping and rotating a leading edge of the paper P with the gripper 23, the paper P is wound around the peripheral surface of the drum and transported.

The treatment liquid coating device 24 includes an coating roller 25, and the paper P transported by the treatment liquid coating drum 22 is coated with the treatment liquid. The coating roller 25 is supported by a contact/separation mechanism (not shown) that is movable between a coating position at which the coating roller 25 comes into contact with the paper P to coat the paper P with the treatment liquid and a retreat position at which the coating roller 25 is separated from the paper P and coating with the treatment liquid is not performed. A function of coating the paper P with the treatment liquid using the treatment liquid coating device 24 is referred to as a "precoating function". The treatment liquid coating device 24 is an example of a "coating device" in the present disclosure.

The ink jet printing apparatus 1 can selectively turn on and off the precoating function. The coating roller 25 is controlled to the coating position in a case where the precoating function is turned on, and the coating roller 25 is controlled to the retreat position in a case where the precoating function is turned off.

Application to a region of the paper P to which the treatment liquid is applied may be entire surface application in which the treatment liquid is applied to the entire paper P or partial application in which the treatment liquid is partially applied to a region to which the ink is applied in the drawing unit 40. From the viewpoint of uniformly adjusting the amount of the treatment liquid to be applied, homogeneously recording fine lines, fine image portions, and the like, and suppressing density unevenness such as image unevenness, the entire surface application in which the treatment liquid is applied to the entire image forming surface of the paper P by the coating using the coating roller or the like is preferable.

A method of coating with the treatment liquid is not limited to the roller coating method. Other methods may be applied to the treatment liquid coating device 24. Examples of other methods of the treatment liquid coating device 24 include coating using a blade, jetting by an ink jet method, and spraying by a spray method.

The treatment liquid drying unit 30 performs a drying treatment on the paper P coated with the treatment liquid. The treatment liquid drying unit 30 includes a treatment liquid drying drum 32 and a hot air blower 34. The treatment liquid drying drum 32 receives the paper P from the treatment liquid coating drum 22 and transports the received paper P to the drawing unit 40. The treatment liquid drying drum 32 is provided with grippers 33 on a peripheral surface of the drum. The treatment liquid drying drum 32 transports the paper P by gripping and rotating the leading edge of the paper P with the grippers 33.

The hot air blower 34 is installed inside the treatment liquid drying drum 32. The hot air blower 34 blows hot air onto the paper P transported by the treatment liquid drying drum 32 to dry the treatment liquid.

The drawing unit 40 includes a drawing drum 42, a head unit 44, and an image reading device 48. The drawing drum 42 receives the paper P from the treatment liquid drying drum 32 and transports the received paper P to the ink drying unit 50. The drawing drum 42 includes grippers 43 on a peripheral surface of the drum, and by gripping and rotating the leading edge of the paper P with the grippers 43, the paper P is wound around the peripheral surface of the drum and transported. The drawing drum 42 includes an adsorption mechanism (not shown), and allows the paper P wound around the peripheral surface of the drum to be adsorbed onto the peripheral surface of the drum and transported. A negative pressure is used for the adsorption. The drawing drum 42 is provided with a large number of adsorption holes on the peripheral surface, and an inside of the drawing drum 42 is suctioned via the adsorption holes to allow the paper P to be adsorbed onto the peripheral surface of the drawing drum 42.

The head unit 44 is configured to include ink jet heads 46C, 46M, 46Y, and 46K. The ink jet head 46C is a recording head that jets droplets of cyan ink. The ink jet head 46M is a recording head that jets droplets of magenta ink. The ink jet head 46Y is a recording head that jets droplets of yellow ink. The ink jet head 46K is a recording head that jets droplets of black ink. Ink is supplied to each of the ink jet heads 46C, 46M, 46Y, and 46K from an ink tank (not shown), which is an ink supply source of the corresponding color, through a pipe path (not shown).

Each of the ink jet heads 46C, 46M, 46Y, and 46K is configured with line heads that can perform printing on the paper P transported by the drawing drum 42 by one scanning, that is, by a single-pass method. Each of the ink jet heads 46C, 46M, 46Y, and 46K has a nozzle surface facing the peripheral surface of the drawing drum 42. The ink jet heads 46C, 46M, 46Y, and 46K are disposed at regular intervals along a transport path of the paper P by the drawing drum 42.

Although not shown in FIG. 1, a plurality of nozzles, which are ink outlets, are two-dimensionally arranged on the nozzle surfaces of each of the ink jet heads 46C, 46M, 46Y, and 46K. The "nozzle surface" refers to a jetting surface on which the nozzles are formed, and is synonymous with a term such as "ink jetting surface" or "nozzle forming surface". The nozzle arrangement of the plurality of nozzles two-dimensionally arranged is referred to as a "two-dimensional nozzle arrangement".

Each of the ink jet heads 46C, 46M, 46Y, and 46K can be configured by connecting a plurality of head modules in a paper width direction. The paper width mentioned here refers to a paper width in a direction perpendicular to a transport direction of the paper P. The transport direction of the paper P is referred to as a Y direction. The paper width direction perpendicular to the Y direction is referred to as an X direction. Each of the ink jet heads 46C, 46M, 46Y, and 46K is a line-type recording head having a nozzle row capable of recording an image of the entire recording region of the paper P in the X direction at a specified printing resolution in one scanning. Such a recording head is also referred to as a "full-line type recording head" or a "page-wide head".

The specified printing resolution may be a printing resolution predetermined by the ink jet printing apparatus 1, or a printing resolution set by a user's selection or an automatic selection by a program according to a print mode. As the printing resolution, for example, 1200 dpi in the X direction and 1200 dpi in the Y direction can be set. "dpi" means dots per inch and is a unit notation representing the number of dots (dots) per inch. One inch is 25.4 mm [mm].

There are cases where the paper width direction (X direction) perpendicular to the transport direction of the paper P is referred to as a nozzle row direction of the line head, and the transport direction (Y direction) of the paper P may be referred to as a nozzle row vertical direction.

In a case of an ink jet head having a two-dimensional nozzle arrangement, a projected nozzle row obtained by projecting (orthography) each nozzle in the two-dimensional nozzle arrangement so as to be aligned along a nozzle row direction can be considered equivalent to a row of nozzle rows in which the nozzles are aligned at approximately equal intervals at a nozzle density that achieves a maximum recording resolution in the nozzle row direction. "Approximately equal intervals" means that dropped points that can be recorded by the ink jet printing apparatus are at substantially equal intervals. For example, the concept of "equal interval" also includes a case in which intervals are set to be slightly different in consideration of movement of droplets on a medium due to manufacturing errors and/or landing interference. The projected nozzle row corresponds to a substantial nozzle row. In consideration of the projected nozzle row, each nozzle can be assigned a nozzle number representing a nozzle position in order of projected nozzles aligned along the nozzle row direction.

An arrangement form of the nozzles in each of the ink jet heads 46C, 46M, 46Y, and 46K is not limited, and various forms of the nozzle arrangement can be adopted. For example, instead of a form of a matrix-like two-dimensional arrangement, a single row of linear arrangement, a V-shaped nozzle arrangement, a broken line-shaped nozzle arrangement such as a W-shaped arrangement having a V-shaped arrangement as a repeating unit, and the like are also possible.

Ink droplets are jetted from at least one of the ink jet heads 46C, 46M, 46Y, and 46K toward the paper P transported by the drawing drum 42, and the jetted droplets adhere to the paper P, whereby an image is formed on the paper P.

The drawing drum 42 functions as a unit for moving the ink jet heads 46C, 46M, 46Y, and 46K and the paper P relative to each other. The drawing drum 42 is a form of a relative moving unit for moving the paper P relative to the ink jet heads 46C, 46M, 46Y, and 46K. Each jetting timing of the ink jet heads 46C, 46M, 46Y, and 46K is synchronized with a rotary encoder signal obtained from a rotary encoder (not shown) installed in the drawing drum 42. The jetting timing is a timing at which ink droplets are jetted, and is synonymous with a dropping timing.

In this example, a configuration in which four color inks of CMYK are used is taken as an example, but the combination of the ink colors and the number of colors is not limited to the present embodiment, and light ink, dark ink, special color ink, or the like may be added as necessary. For example, a configuration in which an ink jet head that jets a light ink such as light cyan or light magenta is added, and/or a configuration in which an ink jet head that jets a special color ink such as green, orange, or white ink is added are possible. In addition, an arrangement order of the ink jet heads of the colors is not particularly limited.

The image reading device 48 is a device that optically reads an image recorded on the paper P by the ink jet heads 46C, 46M, 46Y, and 46K and generates electronic image data indicating the read image. The image reading device 48 includes an imaging device that images the image recorded on the paper P and converts the image into an electrical signal indicating the image information. The image reading device 48 may include, in addition to the imaging device, an illumination optical system that illuminates a reading target and a signal processing circuit that processes the signal obtained from the imaging device to generate digital image data.

The image reading device 48 preferably has a configuration capable of reading a color image. In the image reading device 48 of this example, for example, a color charge-coupled device (CCD) linear image sensor is used as the imaging device. The color CCD linear image sensor is an image sensor in which light-receiving elements including color filters of R (red), G (green), and B (blue) are linearly arranged. A color complementary metal oxide semiconductor (CMOS) linear image sensor can also be used instead of the color CCD linear image sensor. The image reading device 48 reads the image on the paper P while the paper P is being transported by the drawing drum 42. There are cases where the image reading device installed on the paper transport path as described above is referred to as an "in-line scanner" or an "in-line sensor". Alternatively, the image reading device 48 may also be a camera.

When the paper P on which the image is recorded using at least one of the ink jet heads 46C, 46M, 46Y, and 46K passes through a reading region of the image reading device 48, the image on the paper P is read. Images recorded on the paper P include, in addition to a user image as a printing target specified in a printing job, a defective nozzle detection pattern for inspecting a jetting state of each nozzle, a test pattern for correcting a printing density, a test pattern for correcting printing density unevenness, and various other test patterns.

Presence or absence of an abnormality in image quality is determined by inspecting the printed image based on the data of the read image read by the image reading device 48. In addition, based on the data of the read image read by the image reading device 48, information such as a density of the image and the jetting state of each of the nozzles of the ink jet heads 46K, 46C, 46M, and 46Y can be obtained.

The ink drying unit 50 performs a drying treatment on the paper P on which the image is formed by the drawing unit 40. The ink drying unit 50 includes a chain gripper 70, a paper guide 80, and a heat-drying treatment unit 90.

The chain gripper 70 receives the paper P from the drawing drum 42 and transports the received paper P to the accumulation unit 60. The chain gripper 70 includes a pair of endless chains 72 that runs on a predetermined running path, and transports the paper P along a specified transport path in a state of gripping the leading edge of the paper P with the grippers 74 provided in the pair of chains 72. A plurality of grippers 74 are provided on the chain 72 at regular intervals.

The chain gripper 70 of this example is configured to include first sprockets 71A, second sprockets 71B, the chains 72, and the plurality of grippers 74, and has a structure in which the pair of endless chains 72 are wound around a pair of the first sprockets 71A and a pair of the second sprockets 71B. FIG. 1 shows only one side of the pair of first sprockets 71A, the pair of second sprockets 71B, and the pair of chains 72.

The chain gripper 70 has a structure in which the plurality of grippers 74 are disposed at a plurality of positions in a feeding direction (length direction) of the chain 72. In addition, the chain gripper 70 has a structure in which the plurality of grippers 74 are disposed between the pair of chains 72 along the paper width direction. In FIG. 1, only one gripper 74 out of the plurality of grippers 74 arranged between the pair of chains 72 is shown.

The transport path of the paper P by the chain gripper 70 includes a horizontal transport region in which the paper P is transported along a horizontal direction and an inclined transport region in which the paper P is transported in an obliquely upward direction from an end of the horizontal transport region. The horizontal transport region is referred to as a first transport section, and the inclined transport region is referred to as a second transport section.

The paper guide 80 is a mechanism that guides the transportation of the paper P by the chain gripper 70. The paper guide 80 is configured to include a first paper guide 82 and a second paper guide 84. The first paper guide 82 guides the paper P transported in the first transport section of the chain gripper 70. The second paper guide 84 guides the paper transported in the second transport section at the rear of the first transport section.

Figure 2:
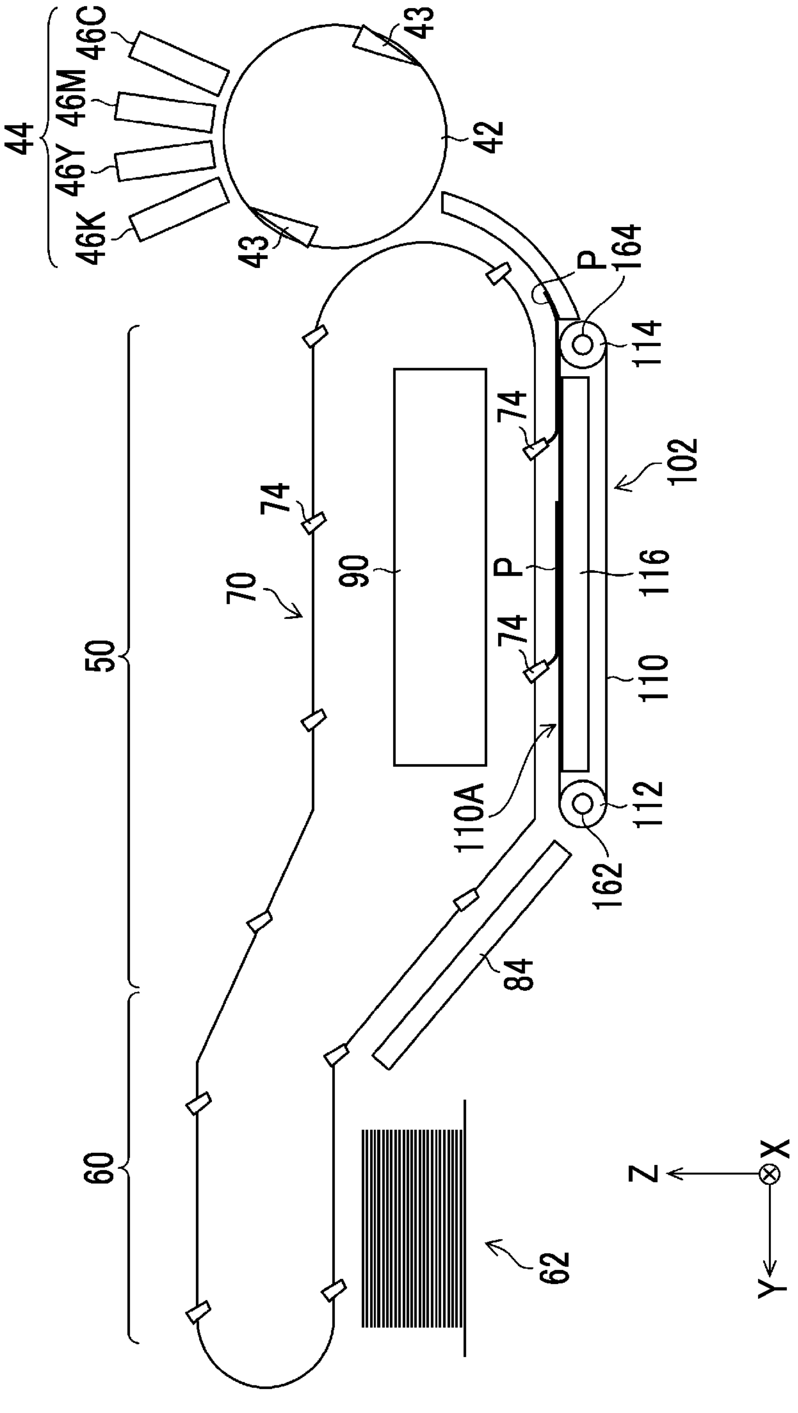
FIG. 2 is a side view showing an overview of an ink drying unit in the ink jet printing apparatus.

Although a detailed structure of the first paper guide 82 is not shown in FIG. 1, an adsorption transport device 102 is used as the first paper guide 82 (see FIG. 2). A detailed description of a configuration of the adsorption transport device 102 will be described later.

The heat-drying treatment unit 90 applies heat to the paper P on which the image is formed by the drawing unit 40 to evaporate the solvent of the ink, thereby drying the paper P. The heat-drying treatment unit 90 is, for example, a hot air blowing unit, which is disposed to face the first paper guide 82 and blows hot air onto the paper P transported by the chain gripper 70.

The accumulation unit 60 includes an accumulation device 62 that receives and accumulates the paper P transported from the ink drying unit 50 by the chain gripper 70. The chain gripper 70 releases the paper P at a predetermined accumulation position. The accumulation device 62 includes an accumulation tray 62A, receives the paper P released from the chain gripper 70, and accumulates the paper P in a bundle on the accumulation tray 62A. The accumulation unit 60 corresponds to a paper output unit.

<<Overview of Ink Drying Unit 50>>

FIG. 2 is a side view showing an overview of the ink drying unit 50 in the ink jet printing apparatus 1. In FIG. 2, the same elements as those having the same configuration shown in FIG. 1 are designated by the same reference numerals, and descriptions thereof will be omitted. In FIG. 2, the image reading device 48, the first sprocket 71A, and the second sprocket 71B are not illustrated for the sake of simplification of the illustration.

The ink drying unit 50 includes the heat-drying treatment unit 90 and the adsorption transport device 102. The heat-drying treatment unit 90 includes, for example, an infrared lamp (not shown) as a heat source and a blower (not shown). The adsorption transport device 102 includes a belt 110, a driving roller 112, a driven roller 114, and a suction box 116.

The belt 110 is an endless belt. The belt 110 has a plurality of adsorption holes for adsorbing the paper P. The belt 110 is stretched over the driving roller 112 and the driven roller 114.

The driving roller 112 is driven to rotate in a counterclockwise direction in FIG. 2. The rotation of the driving roller 112 causes the belt 110 to move circumferentially in the counterclockwise direction in FIG. 2. The driven roller 114 is driven by the belt 110 and rotates in the counterclockwise direction in FIG. 2. In FIG. 2, a direction in which the belt 110 moves from the driven roller 114 toward the driving roller 112 corresponds to the transport direction of the paper P.

The belt 110 has a width in the X direction larger than the width of the paper P in the X direction. The belt 110 supports the paper P transported by the chain gripper 70 and also transports the paper P.

An outer peripheral surface of the belt 110 laid across the driving roller 112 and the driven roller 114 is referred to as a first surface of the belt 110. A surface of the belt 110 opposite to the first surface, that is, an inner peripheral surface of the belt 110 wound around the driving roller 112 and the driven roller 114 is referred to as a second surface of the belt 110. There are cases where the second surface is referred to as a “back surface” of the belt 110.

The first surface of the belt 110 may be a transport surface 110A that supports the paper P and transports the paper P. The transport surface 110A may be paraphrased as a “paper support surface”. The paper P transported by the gripper 74 is placed on the transport surface 110A of the belt 110. The adsorption transport device 102 brings the paper P in which ink is applied to the recording surface into contact with the transport surface 110A of the belt 110 and transports the paper P along the transport path in the Y direction. The transport surface 110A forms a flat surface at least while being in contact with the paper P.

In FIG. 2, a region in which the belt 110 moves from the driven roller 114 to the driving roller 112 in a belt circumferential path of the belt 110, that is, an upper belt path in FIG. 2, is referred to as a first belt path. In addition, a region in which the belt 110 moves from the driving roller 112 to the driven roller 114 in the belt circumferential path, that is, a lower belt path in FIG. 2, is referred to as a second belt path. The second belt path is a return-side belt path. In the case of this example, the transport surface 110A is a flat surface parallel to a horizontal plane, but the transport surface 110A may be an inclined surface having an angle intersecting the horizontal plane. For example, the second paper guide 84 may adopt the same configuration as that of the adsorption transport device 102.

The suction box 116 is disposed on a second surface side of the belt 110 in a space between the driving roller 112 and the driven roller 114, that is, on a back surface side of the belt 110. The suction box 116 is connected to an evacuation pump (not shown). A vacuum blower such as a ring blower can be used as the evacuation pump. The suction box 116 generates an adsorption pressure through the adsorption holes of the belt 110. A region in which the suction box 116 is disposed on the back surface side of the belt 110 in the first belt path is an adsorption area for suctioning and adsorbing the paper P. The suction box 116 may be divided (partitioned) into a plurality of regions in the Y direction.

In addition, in the adsorption transport device 102, infrared lamps 162 and 164 as units for heating the belt 110 are respectively disposed inside the driving roller 112 and the driven roller 114 along rotation axes of the rollers. Temperatures of the infrared lamps 162 and 164 are set to desired temperatures in a range of, for example, 80° C. to 150° C., and the temperatures can be changed as necessary.

By heating the driving roller 112 and the driven roller 114 by the infrared lamps 162 and 164, heat is transferred to the belt 110, so that the belt 110 is indirectly heated. By heating the belt 110, the drying treatment can be efficiently performed in combination with a heat-drying treatment by the heat-drying treatment unit 90.

The paper P on which the image is formed by the drawing unit 40 is delivered from the drawing drum 42 to the chain gripper 70, and is placed on the belt 110 to be adsorbed onto the belt 110 in a state where the leading edge of the paper P is gripped by the gripper 74.

The chain gripper 70 transports the gripper 74 in synchronization with a rotational speed of the drawing drum 42. The driving roller 112 is driven to rotate so as to cause the belt 110 to run in accordance with a feed speed of the gripper 74 by the chain gripper 70.

The belt 110 is fed at substantially the same speed as the gripper 74. A feed speed of the belt 110 and the feed speed of the gripper 74 do not necessarily have to be completely the same, and there may be a slight difference in speed.

The speed difference between the belt 110 and the gripper 74 may vary depending on the size of the paper P and/or rigidity of the paper P. In a case where the speed of the belt 110 is slightly slower than the speed of the gripper 74, the paper P can be transported while being subjected to a tensile force. On the contrary, in a case where the speed of the belt 110 is faster than the speed of the gripper 74, the belt 110 advances while pushing the paper Pin the transport direction.

The belt 110 has a belt length capable of adsorbing and transporting a plurality of sheets of paper P simultaneously. The belt 110 shown in FIG. 2 has a belt length capable of adsorbing and transporting two sheets of paper P simultaneously. However, the belt length of the belt 110 can be appropriately designed, and a form in which three or more sheets of paper P can be simultaneously adsorbed and transported is possible. As an example of dimensions, for example, a roller-to-roller distance between the driving roller 112 and the driven roller 114 may be 1250 mm, and an absorption distance of the suction box 116 may be 1000 mm.

<<Overview of Control System of Ink Jet Printing Apparatus 1>>

Figure 3:
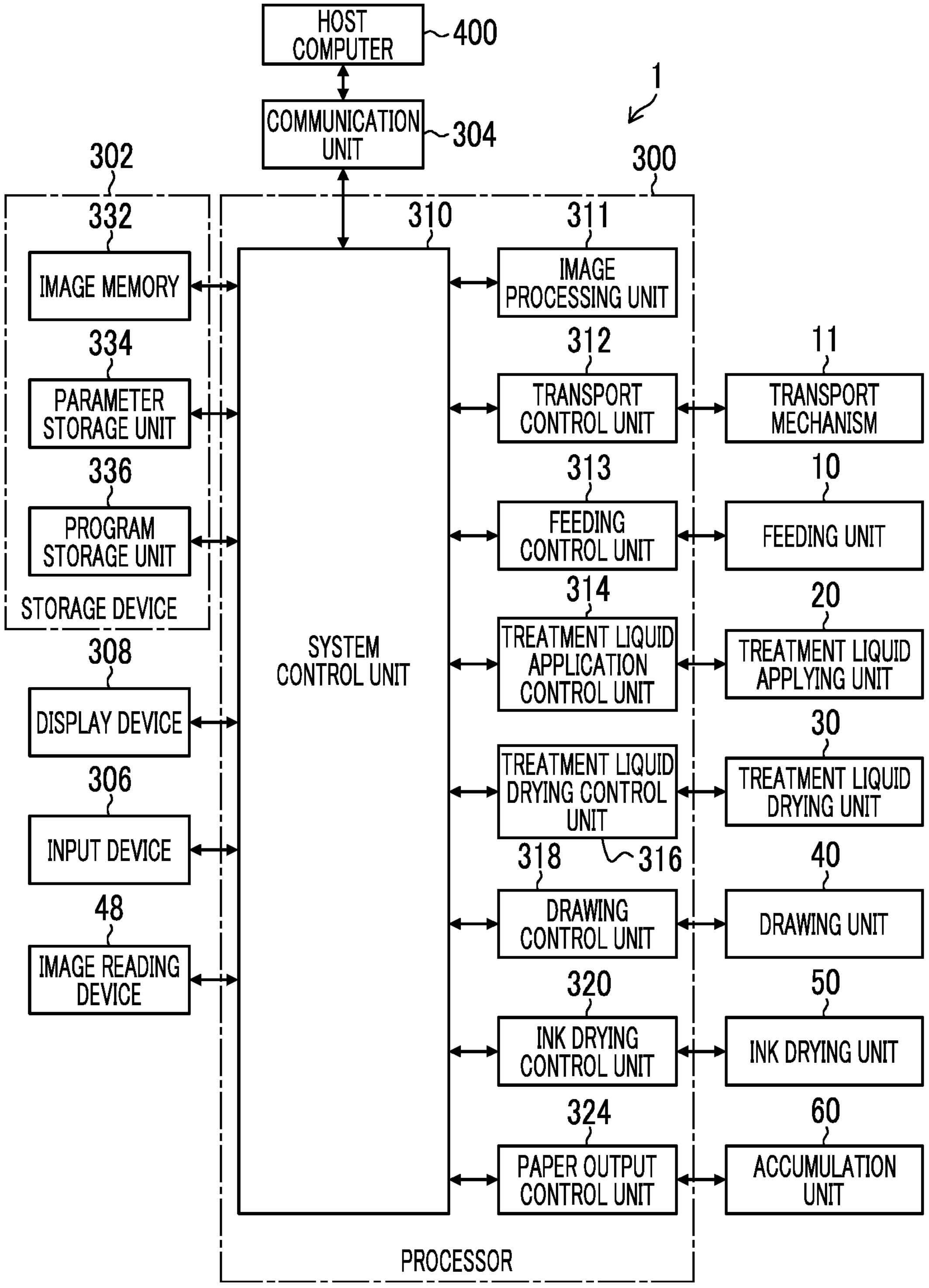
FIG. 3 is a functional block diagram showing a schematic configuration of a control system of the ink jet printing apparatus.

FIG. 3 is a functional block diagram showing a schematic configuration of a control system of the ink jet printing apparatus 1. The ink jet printing apparatus 1 includes a processor 300, a storage device 302, a communication unit 304, an input device 306, and a display device 308.

The processor 300 includes a central processing unit (CPU). The processor 300 functions as a processing unit and/or a control unit that performs various types of processing by executing an instruction of a program stored in the storage device 302. The processor 300 functions as a system control unit 310, an image processing unit 311, a transport control unit 312, a feeding control unit 313, a treatment liquid application control unit 314, a treatment liquid drying control unit 316, a drawing control unit 318, an ink drying control unit 320, and a paper output control unit 324. A processing function of each of the units may be realized by using a plurality of processors. In addition, a part of the processing function required for processing and/or control may be realized by using an integrated circuit represented by a digital signal processor (DSP) or a field programmable gate array (FPGA).

The storage device 302 is a computer-readable medium that is a non-transitory tangible object. The storage device 302 includes a memory that is a main memory and a storage that is an auxiliary storage device. The storage device 302 may be, for example, a semiconductor memory, a hard disk drive (HDD) device, a solid state drive (SSD) device, or a combination thereof. A part or all of a storage area of the storage device 302 may be included in the processor 300.

The storage device 302 includes an image memory 332, a parameter storage unit 334, and a program storage unit 336. The image memory 332 functions as a temporary storage unit for various types of data including the image data.

Various parameters used in the ink jet printing apparatus 1 are stored in the parameter storage unit 334. Various parameters stored in the parameter storage unit 334 are read out via the processor 300 and set in each unit of the apparatus.

The program storage unit 336 stores programs used in each unit of the ink jet printing apparatus 1. Various programs stored in the program storage unit 336 are read out via the processor 300 and executed in each unit of the apparatus.

The system control unit 310 functions as an overall control unit that collectively controls each unit of the ink jet printing apparatus 1. In addition, the system control unit 310 functions as a calculation unit that performs various types of calculation processing. Furthermore, the system control unit 310 controls reading and writing of data in the storage device 302.

The communication unit 304 includes a required communication interface. The ink jet printing apparatus 1 is connected to a host computer 400 via the communication unit 304 and can transmit and receive data to and from the host computer 400. The term "connection" as used here includes a wired connection, a wireless connection, or a combination thereof. The communication unit 304 may be equipped with a buffer memory for increasing a speed of communication processing. The communication unit 304 serves as an image input interface unit for acquiring image data representing an image as a printing target. The image data acquired from the host computer 400 via the communication unit 304 is stored in the image memory 332.

The image processing unit 311 performs various types of conversion processing, correction processing, and halftone processing on the image data as the printing target. The conversion processing includes a pixel count conversion, a gradation conversion, a color conversion, and the like. The correction processing includes a density correction, a non-jetting correction for suppressing visibility of an image defect due to a nozzle that fails in jetting. The image processing unit 311 performs the correction processing based on the read image obtained from the image reading device 48. The halftone processing is generally a process of converting m-valued (m is an integer of 3 or more) multi-gradation image data into n-valued (n is an integer of 2 or more and less than m) data by quantization. The image processing unit 311 converts, for example, an 8-bit (256 gradations) image signal of each color of CMYK into a signal (dot data) representing a multi-valued dot arrangement of three or more values in units of pixels.

Assuming that droplet sizes (dot sizes) in the ink jet heads 46C, 46M, 46Y, and 46K of the ink jet printing apparatus 1 can be classified into three types, small droplets, medium droplets, and large droplets, in this case, the image processing unit 311 converts 8-bit image data layered for each color into a four-gradation (N=4) signal of "jet large droplet ink", "jet medium droplet ink", "jet small droplet ink", and "no jetting (no droplet)". For example, a dither method or an error diffusion method is applied to such halftone processing.

The transport control unit 312 controls an operation of a transport mechanism 11. The transport mechanism 11 includes elements of a mechanism related to the transportation of the paper P from the feeding unit 10 to the accumulation unit 60 described with reference to FIG. 1. The transport mechanism 11 includes the feeding drum 16, the treatment liquid coating drum 22, the treatment liquid drying drum 32, the drawing drum 42, the chain gripper 70, and the like shown in FIG. 1. In addition, the transport mechanism 11 includes a driving unit such as a motor (not shown) or a motor driving circuit (not shown) as a power source. The transport control unit 312 controls a transportation speed of the paper P by the transport mechanism 11 in response to a command from the system control unit 310, and performs control such that the paper P is transported from the feeding unit 10 to the accumulation unit 60.

The feeding control unit 313 operates the feeding unit 10 in response to a command from the system control unit 310. The feeding control unit 313 controls a supply start operation of the paper P, a supply stop operation of the paper P, and the like.

The treatment liquid application control unit 314 operates the treatment liquid applying unit 20 in response to a command from the system control unit 310. The treatment liquid application control unit 314 controls a coating operation of the treatment liquid coating device 24, such as ON/OFF of the precoating function, an application amount of the treatment liquid, and an application timing.

The treatment liquid drying control unit 316 operates the treatment liquid drying unit 30 in response to a command from the system control unit 310. The treatment liquid drying control unit 316 controls a drying temperature, a flow rate of a drying gas, a jetting timing of the drying gas, and the like.

The drawing control unit 318 operates the drawing unit 40 in response to a command from the system control unit 310. The drawing control unit 318 is configured to include a waveform storage unit, a waveform generation unit, and a driving circuit (not shown). The waveform storage unit stores a waveform of a driving voltage applied to jetting energy generating elements of the ink jet heads 46C, 46M, 46Y, and 46K. The waveform generation unit generates the waveform of the driving voltage. The driving circuit generates the driving voltage having a driving waveform corresponding to dot data.

The drawing control unit 318 controls a jetting operation of each of the ink jet heads 46C, 46M, 46Y, and 46K based on the dot data of each ink color generated through the halftone processing of the image processing unit 311 so that the image is recorded on the paper P transported by the drawing drum 42. That is, a jetting timing and an ink jetting amount for each pixel position are determined based on the dot data generated through the processing by the image processing unit 311, a driving voltage according to the jetting timing and the ink jetting amount for each pixel position and a control signal for determining a jetting timing for each pixel are generated, the driving voltage is supplied to the ink jet heads 46C, 46M, 46Y, and 46K, and dots are recorded on the paper P by the inks jetted from the ink jet heads 46C, 46M, 46Y, and 46K.

The drawing control unit 318 can output a predetermined command signal for checking a nozzle state to each of the ink jet heads 46C, 46M, 46Y, and 46K to control printing of a nozzle state evaluation pattern.

The ink drying control unit 320 operates the ink drying unit 50 in response to a command from the system control unit 310. The ink drying control unit 320 controls a temperature of a drying gas, a flow rate of the drying gas, a jetting timing of the drying gas, and the like.

The paper output control unit 324 operates the accumulation unit 60 in response to a command from the system control unit 310. In a case where the accumulation device 62 shown in FIG. 1 includes an elevating mechanism, the paper output control unit 324 controls an operation of the elevating mechanism in response to an increase or decrease in sheets of paper P.

The input device 306 is configured with, for example, an operation button, a keyboard, a mouse, a touch panel, a multi-touch screen, another pointing device, a voice input device, or an appropriate combination thereof. The input device 306 receives various inputs by an operator. The display device 308 is configured with, for example, a liquid crystal display, an organic electro-luminescence (OEL) display, a projector, or an appropriate combination thereof.

Information input via the input device 306 is sent to the system control unit 310. The system control unit 310 executes various types of processing in response to the information input from the input device 306.

The display device 308 may display various types of information such as various types of setting information of the apparatus or abnormality information in response to a command from the system control unit 310. A user (operator) can set various parameters and input and edit various types of information by using the input device 306 while observing contents displayed on the display device 308.

<<Overview of Operation of Ink Jet Printing Apparatus 1>>

In order to enable both high image quality printing and high productivity printing with one apparatus, the ink jet printing apparatus 1 has a standard mode in which high image quality is emphasized and paper is transported at a standard transportation speed and a high-speed mode for improving productivity and is configured to selectively switch between the modes. The high-speed mode is a mode in which productivity is emphasized and paper is transported at a speed higher than the standard transportation speed, and a plurality of modes having different transportation speeds may be prepared.

Here, as a specific example, a case where the standard transportation speed in the standard mode is 3600 sph, two transportation speeds, 5400 sph and 7200 sph, are prepared as the transportation speeds in the high-speed mode, and any one of the transportation speeds can be selected is taken as an example. In addition, “sph” is a unit representing the number of printed sheets per hour (sheets/hour). The standard mode and at least one high-speed mode may be selectable for each printing job.

The standard mode may be paraphrased as “high image quality mode” and the high-speed mode may be paraphrased as “high production mode”. These modes having different transportation speeds may be understood as types of transport mode or types of print mode. The standard mode is an example of a “first mode” in the present disclosure. The high-speed mode is an example of a “second mode” in the present disclosure. 3600 sph is an example of a “first transportation speed” in the present disclosure. Each of 5400 sph and 7200 sph is an example of a “second transportation speed” in the present disclosure. In the present embodiment, an example in which the transportation speed in the high-speed mode is set to 1.5 to 2 times the standard transportation speed is shown. However, the transportation speed in each of the standard mode and the high-speed mode can be appropriately set. Preferably, the transportation speed in the high-speed mode is set to 1.2 times or more the standard transportation speed.

The motor (hereinafter, referred to as a transport driving motor) used as the power source of the transport mechanism 11 is driven by inverter control. In a case of switching between the transportation speeds with a change in the transport mode, the processor 300 changes a rotation speed of the transport driving motor by changing a frequency of the inverter control.

In addition, in the ink jet printing apparatus 1, in a case where switching to the high-speed mode is performed, the function of coating the paper P with the treatment liquid (precoating function) is turned off, and printing is performed in a one-liquid coagulation system. In a case where the standard mode is selected, the precoating function is turned on, and the ink jet printing apparatus 1 performs printing in a two-liquid coagulation system. That is, in the case where the precoating function is turned on (standard mode), the coating roller 25 repeatedly comes into contact with and is separated from each sheet of the paper to transfer the treatment liquid to the paper P. On the other hand, in the case where the precoating function is turned off (high-speed mode), the coating roller 25 is always kept in a separated state, and does not perform the coating. With such a configuration, it is possible to switch between a configuration of the one-liquid coagulation system and a configuration of the two-liquid coagulation system without changing the transport path of the paper P.

Furthermore, the ink jet printing apparatus 1 changes a drying intensity in the ink drying unit 50 in accordance with the change in the transportation speed. There is a concern that with a drying function of a drying device including the heat-drying treatment unit 90 disposed downstream of the drawing unit 40 and the infrared lamps 162 and 164, drying is insufficient in a drying treatment equivalent to that of the standard mode due to an increased speed of the transportation of the paper. Insufficient drying may cause, for example, curling, deterioration of cockling, deterioration of blocking, and deterioration of film resistance. Therefore, in the ink jet printing apparatus 1, in conjunction with the switching to the high-speed mode, the drying intensity of the drying device is also changed to a table of drying conditions according to the high-speed mode, and the drying intensity is increased compared to the standard mode.

In a case of performing printing in the high-speed mode, it is preferable to strengthen the drying intensity of the ink drying unit 50. However, it is possible to reduce a range of increase in the drying intensity by a combination of a decrease in a maximum jetted ink droplet volume and a decrease in a printing resolution. As a specific example, the maximum jetted ink droplet volume in the standard mode is 4.5 pl to 5.5 pl, whereas in the high-speed mode, the maximum jetted ink droplet volume is reduced to 2.5 pl to 3.5 pl, whereby the total amount of ink applied to the paper P can be reduced and a required drying capacity can be reduced. The maximum jetted ink droplet volume is a maximum droplet volume of jetted ink for forming one dot by each of the ink jet heads 46C, 46M, 46Y, and 46K, and means a maximum value of an ink droplet volume per dot jetted from each head. In order to change the maximum jetted ink droplet volume, for example, a droplet volume of the large droplet may be changed, or by not using the large droplet, a droplet volume of the medium droplet may be set as the "maximum jetted ink droplet volume".

In addition, the printing resolution is, for example, 1200 dpi×1200 dpi in the standard mode, whereas in the high-speed mode, for example, the resolution in the Y direction is reduced and the printing resolution is switched to 1200 dpi×600 dpi. Accordingly, the total amount of ink is reduced, so that the required drying capacity can be reduced. 1200 dpi×1200 dpi is an example of a "first printing resolution" in the present disclosure. 1200 dpi×600 dpi is an example of a "second printing resolution" in the present disclosure.

FIG. 4 is a table showing an example of a combination of settings of the printing resolution, the maximum jetted ink droplet volume, and the drying intensity corresponding to each of the standard mode and the high-speed mode. In the high-speed mode, insufficient drying can be suppressed by increasing the drying intensity compared to the standard mode in combination with at least one of the reduction in the maximum jetted ink droplet volume and the reduction in the printing resolution, and printing performance equivalent to that of the standard mode, such as curling, cockling, and film quality performance, can be maintained.

In addition, since the drying intensity required for maintaining the printing performance varies depending on the type and thickness of the paper P used for printing, it is desirable to change the drying intensity within a range of each paper thickness. In the ink jet printing apparatus 1 according to the present embodiment, there is a drying condition table in each paper thickness range for each paper type in each of the standard mode and the high-speed mode.

FIG. 5 is a table showing a setting example of the drying condition table. FIG. 5 shows an example of setting a drying temperature for each paper thickness range in gloss-coated paper. "Hot air temperature" in FIG. 5 is a temperature of the hot air blown from the heat-drying treatment unit 90. "Belt temperature" is a temperature of the belt 110 of the adsorption transport device 102. Since the drying treatment is performed by the hot air from above with respect to a printed surface of the paper P and heat transfer to the belt 110 that adsorbs and holds the paper P, it is necessary to set the temperatures of both. Although not shown in FIG. 5, an appropriate drying temperature is determined for each paper thickness range for a paper type other than the gloss-coated paper, such as matte paper. The processor 300 reads out a drying condition table corresponding to the type and thickness of the paper P used and performs temperature setting.

In addition, the drying condition is not limited to a form in which the drying condition is automatically set according to the table, and the user may manually set the drying condition via the input device 306. The processor 300 may control the drying device according to the drying conditions input via the input device 306.

<<Relationship between Print Image Quality and Transportation Speed>>

In the high-speed mode, the print image quality is considered to be lower than that in the standard mode because the paper P is not coated with the treatment liquid and furthermore the printing resolution is reduced. In the high-speed mode, since a dot diameter of the ink is larger than that in the standard mode due to no precoating (one-liquid coagulation system), it is considered that graininess and/or boundary reproducibility (intercolor bleeding) is worse than in the standard mode.

In addition, it is considered that text reproducibility and line reproducibility are deteriorated in the high-speed mode by lowering the printing resolution compared to the standard mode. The user uses the high-speed mode for a print job that requires high productivity even if the image quality deteriorates and uses the standard mode for a print job in which the image quality is important, depending on a printing application. By using the high-speed mode, the productivity is improved, and it is possible to increase the productivity by 1.5 times the productivity in the standard mode (3600 sph) at 5400 sph and by twice at 7200 sph.

<<Example of Printing Operation in Ink Jet Printing Apparatus 1>>

Figure 6:
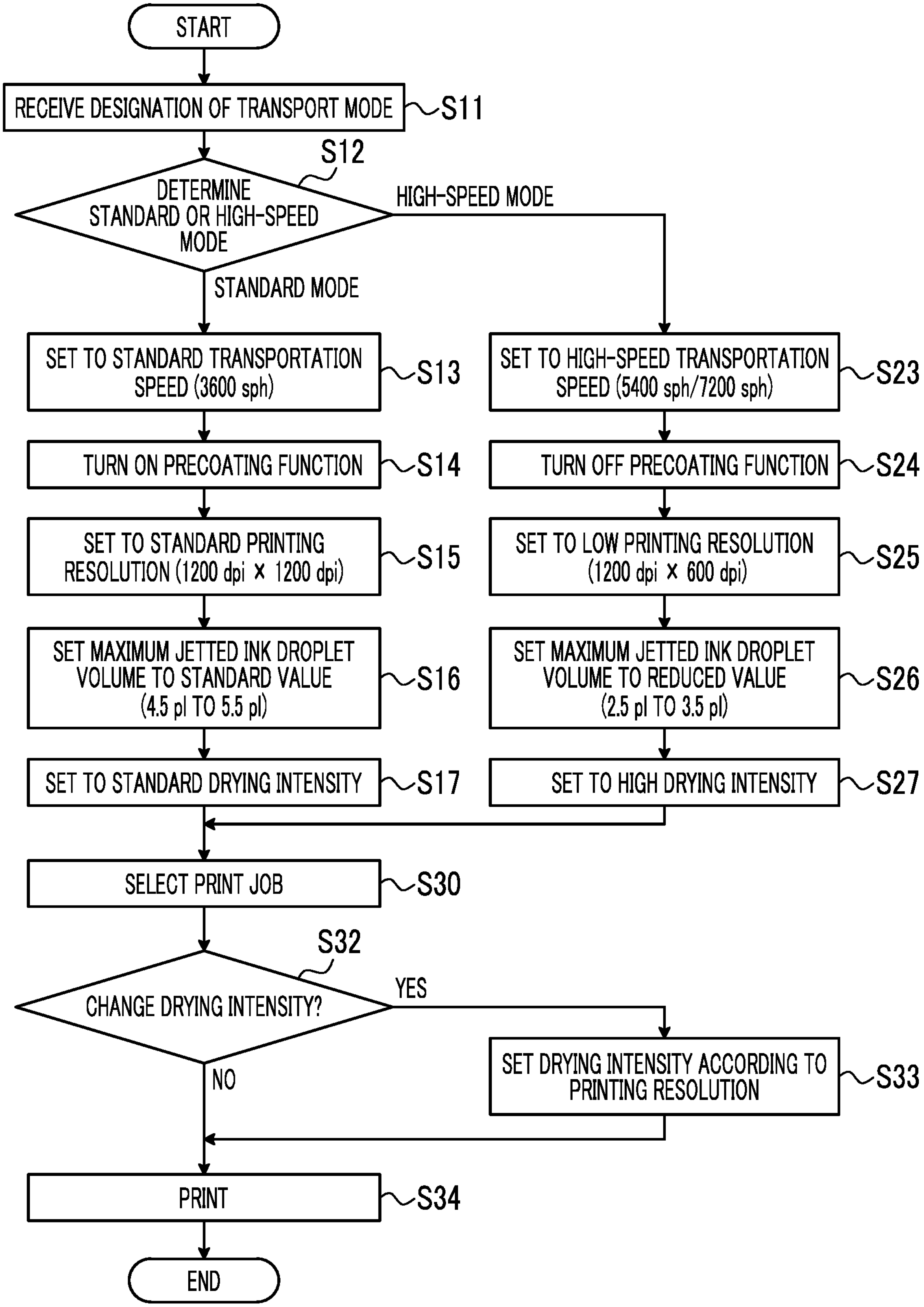
FIG. 6 is a flowchart showing an example of control performed in a case where a transportation speed is changed.

FIG. 6 is a flowchart showing an example of a printing operation in the ink jet printing apparatus 1. FIG. 6 shows a control example in which the transportation speed is changed. In step S11, the processor 300 receives an input of designation of the transport mode. For example, the processor 300 receives an input of information designating the standard mode or the high-speed mode from the input device 306. Alternatively, the processor 300 may set the standard mode as a default and may receive an instruction to change to the high-speed mode via the input device 306 according to a command of the program.

In step S12, the processor 300 performs a mode determination to determine whether the designated mode is the standard mode or the high-speed mode. In a case where a determination result in step S12 is the "standard mode", the processor 300 proceeds to step S13.

In step S13, the processor 300 sets the transportation speed to the standard transportation speed. The standard transportation speed may be, for example, 3600 sph.

Next, in step S14, the processor 300 turns on the precoating function. Accordingly, the ink jet printing apparatus 1 functions as a two-liquid coagulation system apparatus.

Then, in step S15, the processor 300 sets the printing resolution to a standard printing resolution. The standard printing resolution may be, for example, 1200 dpi×1200 dpi.

Next, in step S16, the processor 300 sets the maximum jetted ink droplet volume to a standard value. The standard value of the maximum jetted ink droplet volume may be, for example, a value in a range of 4.5 pl or more and 5.5 pl or less. This standard value is an example of a “first droplet volume” in the present disclosure.

Next, in step S17, the processor 300 sets the drying intensity of the ink drying unit 50 to a standard drying intensity. A drying condition of the standard drying intensity and a drying condition of a high drying intensity, which will be described later, are held in the storage device 302 as table data in advance according to the type and thickness of the paper P used for printing. The processor 300 can read out a drying condition suitable for the condition of the type and thickness of the paper P to be used from the table data. Information on the type and thickness of the paper P may be input from the input device 306 or may be input using a reading device such as a barcode (not shown). After step S17, the processor 300 proceeds to step S30. The order of processing in steps S13 to S17 can be changed as appropriate.

On the other hand, in a case where the determination result in step S12 is the “high-speed mode”, the processor 300 proceeds to step S23.

In step S23, the processor 300 sets the transportation speed to a high-speed transportation speed. The high-speed transportation speed may be, for example, 5400 sph or 7200 sph depending on the type of the designated high-speed mode.

Next, in step S24, the processor 300 turns off the precoating function. Accordingly, the ink jet printing apparatus 1 functions as a one-liquid coagulation system apparatus. In a case where the precoating function is turned off, the drying treatment in the treatment liquid drying unit 30 is also turned off.

Next, in step S25, the processor 300 sets the printing resolution to a low printing resolution that is lower than the standard printing resolution. The low printing resolution may be, for example, 1200 dpi×600 dpi.

Next, in step S26, the processor 300 sets the maximum jetted ink droplet volume to a reduced value smaller than the standard value. The reduced value of the maximum jetted ink droplet volume may be a smaller amount than the standard value, and may be, for example, a value determined in a range of 2.5 pl or more and 3.5 pl or less. This reduced value is an example of a “second droplet volume” in the present disclosure.

Next, in step S27, the processor 300 sets the drying intensity of the ink drying unit 50 to the high drying intensity that is higher than the standard drying intensity. After step S27, the processor 300 proceeds to step S30. The order of processing in steps S23 to S27 can be changed as appropriate.

In step S30, the processor 300 receives the selection of the print job. In a case where the print job to be processed is designated by the input from the user or the like, in step S32, the processor 300 determines whether or not to change the drying intensity.

In a case where a determination result in step S32 is YES, the processor 300 proceeds to step S33. In step S33, the processor 300 sets the drying intensity according to the printed image. That is, the processor 300 corrects (changes) the setting of the drying intensity according to an image content of a printing target designated in the print job. This is a process of evaluating the total amount of ink from the image of the printing target and changing the drying conditions to more appropriate conditions in accordance with the total amount of ink.

After step S32, the processor 300 proceeds to step S34. In addition, in a case where the determination result in step S32 is NO, the processor 300 proceeds to step S34.

In step S34, the processor 300 executes printing in accordance with conditions of the print job. In a case where the standard mode is set, the paper P is transported at the standard transportation speed (3600 sph) by the transport mechanism 11, the paper P is coated with the treatment liquid by the treatment liquid coating device 24, and jetting is performed on the paper P coated with the treatment liquid, by the ink jet heads 46C, 46M, 46Y, and 46K. On the other hand, in a case where the high-speed mode is set, the paper P is transported at the high-speed transportation speed (5400 sph or 7200 sph) by the transport mechanism 11, coating with the treatment liquid by the treatment liquid coating device 24 is not performed, and jetting is performed on the paper P that is not coated with the treatment liquid, by the ink jet heads 46C, 46M, 46Y, and 46K. In this manner, the image is formed on the paper P, and a printed material is obtained through the drying treatment in the ink drying unit 50. After step S34, the processor 300 ends a flowchart of FIG. 6. A printing method according to the flowchart of FIG. 6 is an example of a “method of manufacturing a printed material” in the present disclosure.

Example 1

Figures 7, 8, 9:
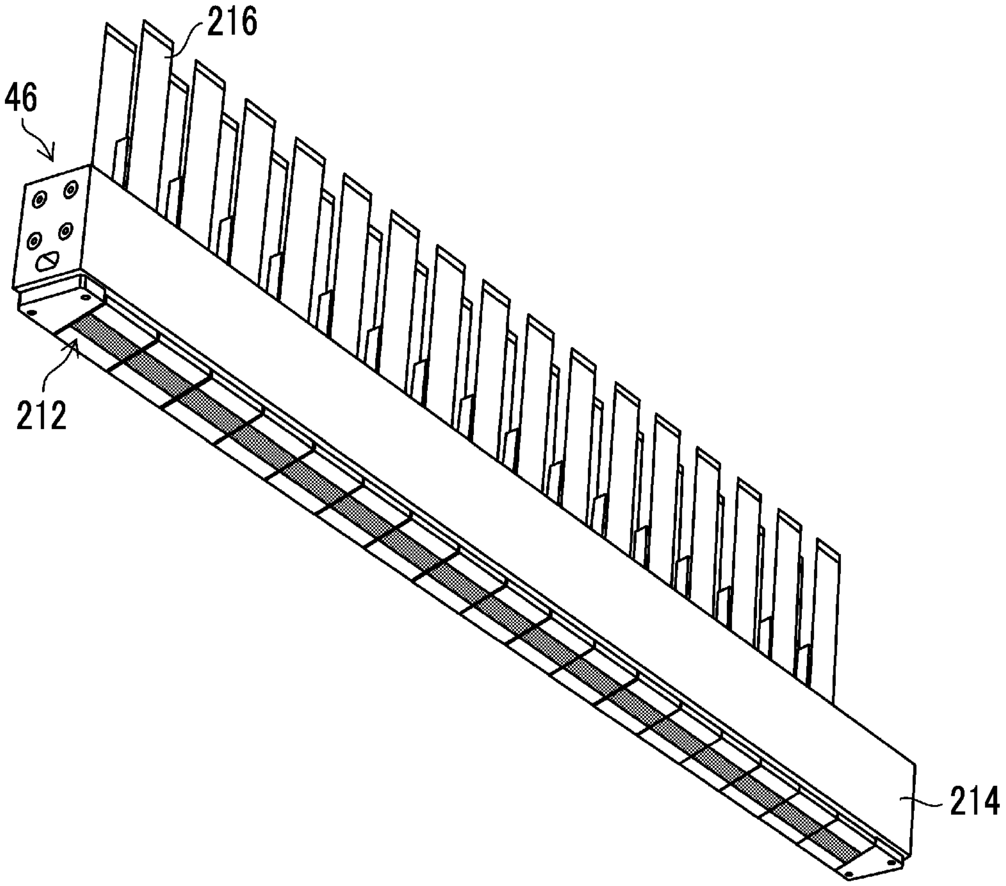
FIG. 7 is a table showing evaluation results of a film quality strength of a printed surface in a case where thick paper according to Example 1 is used and a combination of conditions of the transportation speed and the drying intensity is changed.
FIG. 8 is a table showing evaluation results of the film quality strength of the printed surface in a case where thin paper according to Example 2 is used and the combination of the conditions of the transportation speed and the drying intensity is changed.
FIG. 9 is a perspective view of an ink jet head.

Hereinafter, evaluation results of the film quality performance (film quality strength) of the printed surface in a case where a specific brand of paper P is used and the combination of the conditions of the transportation speed and the drying intensity is changed will be described using. In Example 1, film quality strength in a case where “I-BEST” (registered trademark: Nippon Paper Industries Co., Ltd.) having a basis weight of 310 gsm (paper thickness 0.34 mm) was used as the paper P and the combination of the conditions of the transportation speed and the drying intensity was changed was evaluated. Example 1 corresponds to a performance evaluation in so-called “thick paper”. FIG. 7 shows evaluation results. The basis weight is a nominal value of a manufacturer, and the unit gsm is “g/m$^2$”.

The film quality strength is one of indexes showing the hardness of a coating film on the printed surface. As a method of measuring the film quality strength, the paper P immediately after printing, drying, and outputting was measured with a “pendulum type hardness tester”.

The film quality strength is one of characteristics that substitute for blocking performance and/or the film quality performance. Blocking means peeling of the printed surface due to overlapping of the printed material. Film quality performance refers to abrasion resistance, scratch resistance, and the like.

The symbol A shown in FIG. 7 and FIG. 8 described later indicates a performance (film quality strength) that satisfies product specifications. The other symbols “A+”, “B”, “C”, and “D” indicate performance in the order of D<C<B<A<A+ with the symbol A as a reference. An “A+” rating indicates particularly excellent performance, while “B” through “D” ratings are levels that do not satisfy the product specifications.

Regarding the maximum jetted ink droplet volume and the printing resolution, at a transportation speed of 3600 sph, printing is performed with settings of a maximum jetted ink droplet volume of 5 pl and a printing resolution of 1200 dpi×1200 dpi, and at transportation speeds of 5400 sph and 7200 sph, printing is performed with settings of a maximum jetted ink droplet volume of 3.5 pl and a printing resolution of 1200 dpi×600 dpi.

The notation “standard (150° C./120° C.)” indicates that the drying intensity is set to the standard drying intensity, the hot air temperature as the drying condition of the ink drying unit 50 is 150° C., and the belt temperature is 120° C. The standard drying intensity is an example of a “first drying intensity” in the present disclosure.

The notation “UP (170° C./140° C.)” indicates that the drying intensity is set to the high drying intensity in which the drying intensity is increased (up) from the standard drying intensity, the hot air temperature is 170° C., and the belt temperature is 140° C. The high drying intensity is an example of a “second drying intensity” in the present disclosure.

It has been confirmed that the film quality strength is deteriorated by increasing the transportation speed while maintaining the standard drying intensity, and the film quality strength is further deteriorated at 7200 sph. On the other hand, by increasing the drying intensity, it is possible to maintain the film quality strength at the product specification level even if the transportation speed is increased.

This result is a result in a case where the maximum jetted ink droplet volume is the same, and it has been confirmed that the film quality is improved by reducing the maximum jetted ink droplet volume. In addition, the result shows that curling and cockling, which are other print quality performances, are rarely affected by an increase in transportation speed and an increase in drying intensity at a basis weight of 310 gsm of I-BEST (registered trademark: Nippon Paper Industries Co., Ltd.).

Example 2

In Example 2, film quality strength in a case where “OK TopKote+” (registered trademark: Oji Paper Co., Ltd.) having a basis weight of 104 gsm (paper thickness 0.09 mm) was used as the paper P and the combination of the conditions of the transportation speed and the drying intensity was changed was evaluated. Example 2 corresponds to a performance evaluation in so-called “thin paper”. FIG. 8 shows evaluation results. An evaluation method, and settings of the maximum jetted ink droplet volume and the printing resolution are the same as those in “Example 1”.

The drying conditions of the standard drying intensity in Example 2 are set to a hot air temperature of 100° C. and a belt temperature of 90° C. In addition, the drying conditions of the high drying intensity in Example 2 are set to a hot air temperature of 110° C. and a belt temperature of 100° C. In the case of “OK TopKote+” having a basis weight of 104 gsm, although the film quality strength is deteriorated by increasing the transportation speed while maintaining the standard drying intensity, the film quality strength is not extremely deteriorated as in the case of I-BEST (registered trademark) having a basis weight of 310 gsm. At 5400 sph, the film quality strength is not substantially changed, and at 7200 sph, the film quality strength is only slightly deteriorated. Therefore, it is possible to maintain the film quality strength at or above the product specification level by slightly increasing the drying intensity from the standard drying intensity.

On the other hand, in a case where the drying intensity of thin paper is excessively increased, paper deformation increases, and there is a concern that curling and/or cockling deteriorates. In addition, even if the drying intensity is too low, curling and/or cockling deteriorates, so that an optimum drying intensity exists for thin paper. It is considered that the condition of UP (110/100° C.) shown in FIG. 8 is the maximum drying intensity that allows the paper deformation such as curling and/or cockling.

<<Ink Used for Printing>>

In the ink jet printing apparatus 1 according to the present embodiment, the same ink is used in the high-speed mode (one-liquid coagulation system) and the standard mode (two-liquid coagulation system). By using the same ink in the printing in the standard mode and in the printing in the high-speed mode, the ink is not replaced for each transportation speed, so that waste in switching the transportation speed does not occur. Accordingly, in a case where printing for a plurality of applications is performed while switching between the transport modes, the productivity as a whole is improved.

<<Example of Treatment Liquid>>

The treatment liquid used in the present embodiment contains a component (coagulation-inducing component) capable of coagulating components in an ink composition by being brought into contact with the ink composition of each color of CMYK and thus forming a coagulation containing a pigment. Examples of the coagulation-inducing component include a component selected from an acidic compound, a polyvalent metal salt, and a cationic polymer. The treatment liquid may contain, if necessary, other components in addition to the coagulation-inducing component. The treatment liquid is usually in a form of an aqueous solution. By using the treatment liquid together with the ink composition, ink jet printing can be increased in speed, and even in high-speed printing, an image having drawability with high density and resolution, for example, excellent reproducibility of fine lines and fine portions can be obtained.

<Acidic Compound>

The acidic compound can coagulate (immobilize) components in the ink composition by being brought into contact with the ink composition on a recording medium, and functions as an immobilizing agent. Examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidonecarboxylic acid, pyrronecarboxylic acid, pyrrolecarboxylic acid, furancarboxylic acid, pyridinecarboxylic acid, coumaric acid, thiophenecarboxylic acid, nicotinic acid, oxalic acid, and benzoic acid. From the viewpoint of achieving both suppression of volatilization and solubility in a solvent, the acidic compound is preferably an acid having a molecular weight of 35 or more and 1000 or less, more preferably an acid having a molecular weight of 50 or more and 500 or less, and particularly preferably an acid having a molecular weight of 50 or more and 200 or less. In addition, from the viewpoint of achieving both prevention of ink bleeding and photocuring properties, an acid dissociation constant pKa (in $H_2O$, 25° C.) of the acid is preferably −10 or more and 7 or less, more preferably 1 or more and 7 or less, and particularly preferably 1 or more and 5 or less.

Among these, an acidic compound having a high water solubility is preferable. In addition, from the viewpoint of reacting with the ink composition to immobilize the entire ink, a trivalent or less acidic compound is preferable, and a divalent or trivalent acidic compound is particularly preferable. In the treatment liquid, the acidic compounds can be used alone or in combination of two or more.

In a case where the treatment liquid is an aqueous solution containing the acidic compound, a pH (25° C.) of the treatment liquid is preferably 0.1 to 6.8, more preferably 0.1 to 6.0, and even more preferably 0.1 to 5.0.

In a case where the treatment liquid contains the acidic compound as the coagulation component, an amount of the acidic compound in the treatment agent is preferably 40 mass % or less, more preferably 15 to 40 mass %, even more preferably 15 to 35 mass %, and particularly preferably 20 to 30 mass %. By setting the amount of the acidic compound in the treatment agent to 15 to 40 mass %, the components in the aqueous ink composition can be more efficiently immobilized.

In a case where the treatment liquid contains the acidic compound as the coagulation-inducing component, the amount of the treatment liquid to be applied to the recording medium is not particularly limited as long as the amount is sufficient to coagulate the ink composition. However, from the viewpoint of facilitating immobilization of the ink composition, it is preferable that the treatment agent is applied so that the amount of the acidic compound applied is 0.5 $g/m^2$ to 4.0 $g/m^2$, and it is preferable that the treatment agent is applied so that the amount of the acidic compound applied is 0.9 $g/m^2$ to 3.75 $g/m^2$.

<Polyvalent Metal Salt>

The treatment liquid also preferably contains one or two or more kinds of polyvalent metal salts as the coagulation-inducing component. By including the polyvalent metal salt as the coagulation-inducing component, high-speed coagulation can be improved. Examples of the polyvalent metal salt include a salt of an alkaline earth metal (for example, magnesium and calcium) in group 2 in the periodic table, a salt of a transition metal (for example, lanthanum) in group 3 in the periodic table, a salt of a cation (for example, aluminum) from group 13 in the periodic table, and a salt of lanthanides (for example, neodymium). Suitable metal salts include carboxylates (such as fomate, acetate, and benzoate), nitrates, chlorides, and thiocyanates. Particularly preferable metal salts include a calcium salt or a magnesium salt of a carboxylic acid (such as fomate, acetate, and benzoate), a calcium salt or a magnesium salt of a nitric acid, calcium chloride, magnesium chloride, and a calcium salt or a magnesium salt of a thiocyan acid.

In a case where the treatment liquid contains the polyvalent metal salt as the coagulation-inducing component, the amount of the polyvalent metal salt in the treatment liquid is preferably 1 to 10 mass %, and more preferably 1.5 to 7 mass %, and more preferably in a range of 2 to 6 mass % from the viewpoint of a coagulation-inducing effect.

<Cationic Polymer>

In addition, it is also preferable that the treatment liquid contains one or two or more kinds of cationic polymers as the coagulation-inducing component. Examples of the cationic polymer include a homopolymer of a cationic monomer having a primary to tertiary amino group or a quaternary ammonium base as a cationic group, and a copolymer or a condensation polymer of the cationic monomer and a non-cationic monomer. The cationic polymer may be used in any form of a water-soluble polymer or water-dispersible latex particles.

Specific preferable examples of the cationic polymer include cationic polymers such as poly(vinylpyridine) salts, polyalkyl aminoethyl acrylate, polyalkyl aminoethyl methacrylate, poly(vinylimidazole), polyethyleneimine, polybiguanide, polyguanide, and polyarylamine, and derivatives thereof. From the viewpoint of a viscosity of the treatment liquid, it is preferable that a weight-average molecular weight of the cationic polymer is small. From the viewpoint of the coagulation-inducing effect, the amount of the cationic polymer in the treatment liquid is preferably 1 to 50 mass %, more preferably 2 to 30 mass %, and even more preferably 2 to 20 mass %.

<Other Additives>

The treatment liquid can further contain other additives as other components as long as the desired coagulation effect is not impaired. Examples of other additives include an anti-drying agent (wetting agent), an antifading agent, an emulsion stabilizer, a penetration enhancer, an ultraviolet absorber, a preservative, a fungicide, a pH adjuster, a surface tension adjuster, an antifoaming agent, a viscosity adjuster, a dispersant, a dispersion stabilizer, a rust inhibitor, and a chelating agent.

<<Configuration Example of Ink Jet Head>>

Since structures of the ink jet heads 46K, 46C, 46M, and 46Y are common, the ink jet heads 46K, 46C, 46M, and 46Y are described as an ink jet head 46 here.

FIG. 9 is a perspective view of the ink jet head 46. FIG. 9 illustrates a state in which a nozzle surface is viewed from below in an obliquely downward direction of the ink jet head 46. The ink jet head 46 is a full-line type line head in which a plurality of head modules 212 are arranged in the paper width direction to be elongated.

Although FIG. 9 shows an example in which 17 head modules 212 are connected, a structure of the head modules 212, the number of head modules 212, and an arrangement form thereof are not limited to the illustrated examples. Reference numeral 214 in the drawing denotes a base frame that serves as a frame for connecting and fixing the plurality of head modules 212 in a bar shape. Reference numeral 216 denotes a flexible substrate connected to each head module 212. The plurality of head modules 212 are attached to the base frame 214 and integrated to form one bar-shaped ink jet head 46.

Figure 10:
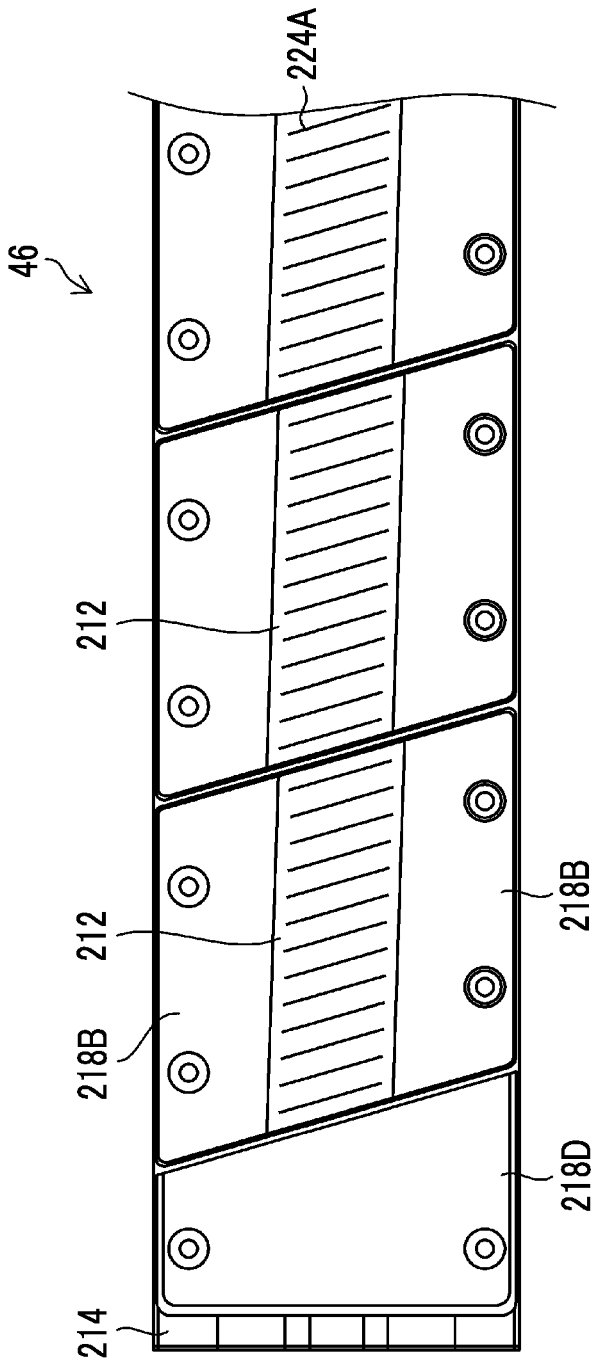
FIG. 10 is a partially enlarged view of the ink jet head as viewed from a nozzle surface side.

FIG. 10 is a partially enlarged view of the ink jet head 46 as viewed from a nozzle surface side. The head modules 212 are supported by module support members 218B from both sides in an up-down direction of FIG. 10, which is a lateral direction of the ink jet head 46, and are attached to the base frame 214 via the module support members 218B. In addition, both ends of the ink jet head 46 in a longitudinal direction thereof are supported by head protection members 218D.

Although individual nozzles are not shown in FIG. 10, diagonal solid lines shown with reference numeral 224A represent nozzle rows in which a plurality of nozzles are arranged in a row.

Figure 11:
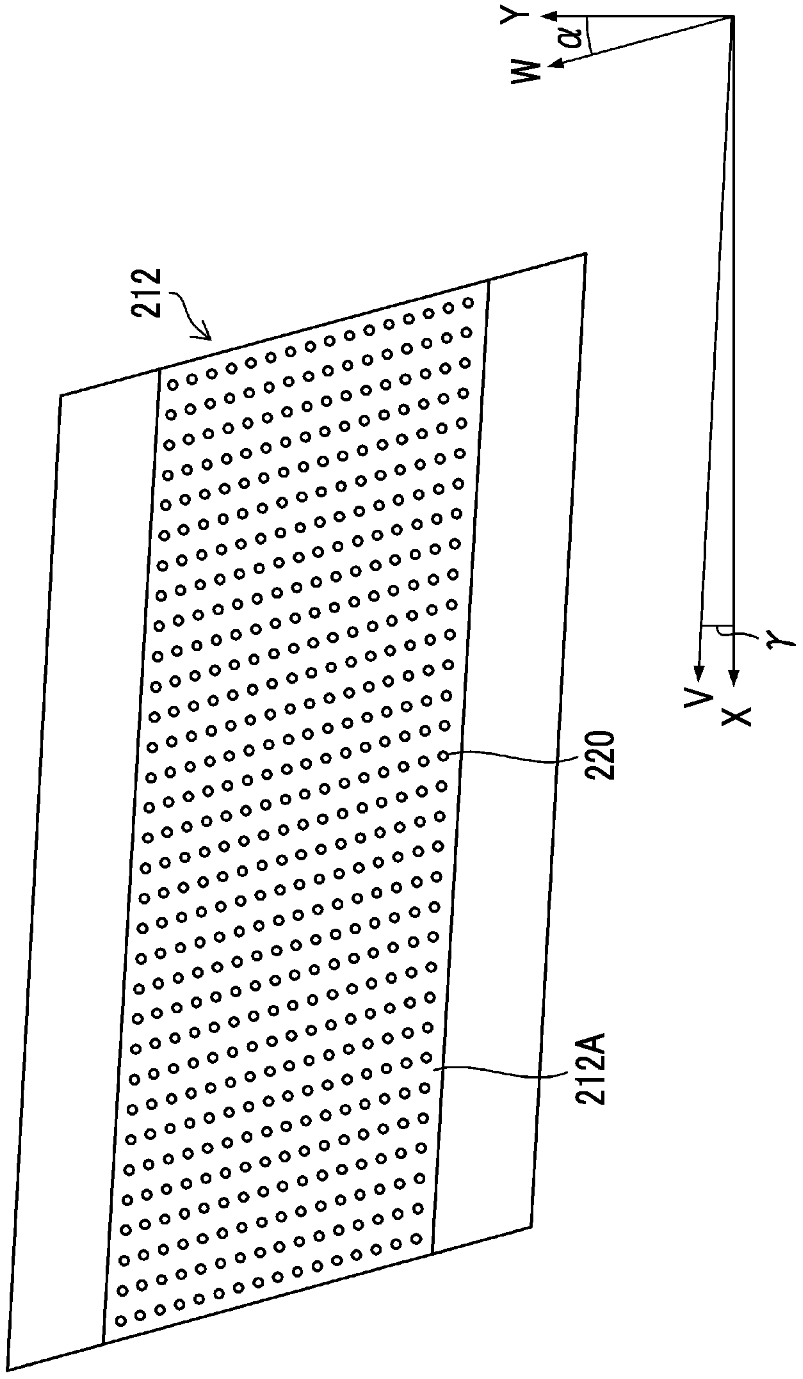
FIG. 11 is a plan view of a nozzle surface of a head module as viewed from a jetting side.

FIG. 11 is a plan view of a nozzle surface 212A of the head module 212 as viewed from a jetting side. Although the number of nozzles drawn is reduced in FIG. 11 for convenience of illustration, for example, 32×64 nozzles 220 are two-dimensionally arranged on the nozzle surface 212A of one head module 212. In addition, a liquid repellent film is formed on the nozzle surface 212A.

In FIG. 11, a Y direction is the paper transport direction, and a X direction perpendicular to the Y direction is the paper width direction. The head module 212 includes an end surface on a long side along a V direction having an inclination of an angle $\gamma$ with respect to the X direction, and an end surface on a short side along a W direction having an inclination of an angle $\alpha$ with respect to the Y direction, and thus has a parallelogram shape in a plan view.

By connecting a plurality of such head modules 212 in the X direction, nozzle rows that cover an entire drawing range of the paper P in the X direction is formed, so that a line head in which image recording with a predetermined recording resolution is possible in one drawing scanning is configured. The full-line type line head applied to the single-pass method is not limited to a case where the entire surface of the paper P as the recording medium is a print range, and in a case where a part of the recording medium is the print region (for example, a case where a margin portion is provided in the recording medium), a nozzle row required for printing may be formed.

Figure 12:
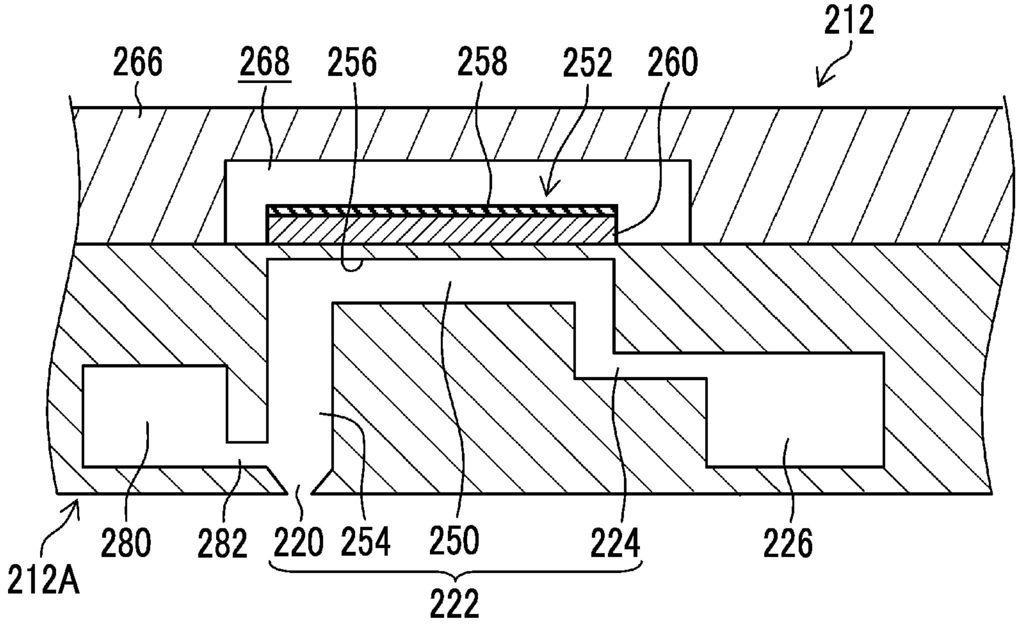
FIG. 12 is a longitudinal sectional view showing a three-dimensional structure of one ejector in the head module.

FIG. 12 is a longitudinal sectional view showing a three-dimensional structure of one ejector 222 in the head module 212. The ejector 222 includes the nozzle 220, a pressure chamber 250 communicating with the nozzle 220, and a piezoelectric element 252. The nozzle 220 communicates with the pressure chamber 250 via a nozzle flow path 254. The pressure chamber 250 communicates with a supply-side common flow path 226 through an individual supply path 224.

A vibration plate 256 that forms a top surface of the pressure chamber 250 has a conductive layer (not shown) that functions as a common electrode corresponding to a lower electrode of the piezoelectric element 252. Wall portions of other flow path portions of the pressure chamber 250, the vibration plate 256, and the like can be made of silicon. A material of the vibration plate 256 is not limited to silicon, and a form in which the vibration plate 256 is formed of a non-conductive material such as a resin is also possible. A conductive layer made of a conductive material is formed on a surface of the vibration plate member. The vibration plate 256 itself may be formed of a metal material such as stainless steel to serve as a vibration plate that also serves as a common electrode.

A piezoelectric unimorph actuator is configured by a structure in which the piezoelectric element 252 is laminated on the vibration plate 256. A driving voltage is applied to the individual electrode 258, which is an upper electrode of the piezoelectric element 252, to deform a piezoelectric body 260 and bend the vibration plate 256, whereby a volume of the pressure chamber 250 is changed. Ink is jetted from the nozzle 220 due to a pressure change accompanying the volume change. In a case where the piezoelectric element 252 returns to its original state after the ink is jetted, the pressure chamber 250 is filled with new ink is from the supply-side common flow path 226 through the individual supply path 224. An operation of filling the pressure chamber 250 with ink is called "refilling". In this example, a configuration in which the vibration plate 256 is bent by using strain deformation of a d31 mode of the piezoelectric body 260 is illustrated. However, a form using a d33 mode or a form in which jetting is performed using a shear mode (shear deformation) is also possible.

A planar shape of the pressure chamber 250 is not particularly limited, and may have various shapes such as a quadrangular shape, a polygonal shape, a circular shape, and an elliptical shape.

In addition, the head module 212 of this example includes a recovery-side common flow path 280, and an individual recovery path 282 is connected to the nozzle flow path 254 of each ejector 222. The individual recovery path 282 is connected to the recovery-side common flow path 280.

Reference numeral 266 in FIG. 12 denotes a cover plate. The cover plate 266 is a member that holds a movable space 268 of the piezoelectric element 252 and seals a periphery of the piezoelectric element 252. A supply-side ink chamber and a recovery-side ink chamber (not shown) are formed above the cover plate 266. The supply-side ink chamber is connected to the supply-side common flow path 226 through a communication path (not shown). The recovery-side ink chamber is connected to the recovery-side common flow path 280 via a communication path (not shown). The ink supplied from the supply-side common flow path 226 to the pressure chamber 250 via the individual supply path 224 is jetted from the nozzle 220 through the nozzle flow path 254. In addition, ink that is not used for the jetting is recovered from the nozzle flow path 254 to the recovery-side common flow path 280 via the individual recovery path 282.

In a state where there is a pressure difference between a pressure of the supply-side common flow path 226 and a pressure of the recovery-side common flow path 280 and ink is not jetted from the ejector 222, ink flows from the individual supply path 224 to the recovery-side common flow path 280 through the pressure chamber 250 and the individual recovery path 282.

By adopting such an ink circulation structure, thickening of the ink in the pressure chamber 250 is prevented, and jetting stability can be improved. In a case of refilling in a case where the ink is jetted from the ejector 222, the ink is supplied from the supply-side common flow path 226 to the pressure chamber 250 through the individual supply path 224, and the ink is supplied from the recovery-side common flow path 280 to the pressure chamber 250 through the individual recovery path 282. That is, the recovery-side common flow path 280 can play a role of not only recovering the ink from the ejector 222 but also supplying the ink to the ejector 222 in the case of refilling.

<<Hardware Configuration of Various Processing Units and Control Units>>

Hardware structures of the processing units that executing various processes, such as the system control unit 310, the image processing unit 311, the transport control unit 312, the feeding control unit 313, the treatment liquid application control unit 314, the treatment liquid drying control unit 316, the drawing control unit 318, the ink drying control unit 320, the paper output control unit 324, and communication unit 304 described with reference to FIG. 3 are various processors as described below.

The various processors include a central processing unit (CPU), which is a general-purpose processor that executes a program and functions as various processing units, a programmable logic device (PLD), which is a processor that can be changed in circuit configuration after manufacturing, such as a field programmable gate array (FPGA), a dedicated electric circuit, which is a processor having a circuit configuration specially designed for executing a specific process, such as an application specific integrated circuit (ASIC), and the like.

One processing unit may be configured with one of these various processors, or may be configured with two or more processors of the same type or different types. For example, one processing unit may be configured by a plurality of FPGAs or a combination of a CPU and an FPGA. Alternatively, a plurality of processing units may be configured with one processor. As an example in which a plurality of processing units are configured with one processor, first, as represented by a computer such as a client or a server, there is a form in which one processor is configured by a combination of one or more CPUs and software, and this processor functions as a plurality of processing units. Secondly, as represented by a system-on-chip (SoC) or the like, there is a form in which a processor that realizes the functions of the entire system including a plurality of processing units with one integrated circuit (IC) chip is used. As described above, the various processing units are configured by using one or more of the various processors as the hardware structure.

Furthermore, the hardware structure of these various processors is, more specifically, an electric circuit (circuitry) in which circuit elements such as semiconductor elements are combined.

<<Program That Causes Computer to Function as Control Device>>>

It is possible to record a program that causes a computer to realize the control functions of the ink jet printing apparatus 1 described in the above embodiment on a computer readable medium, which is an optical disk, a magnetic disk, or another tangible non-transitory information storage medium, and to provide the program through this information storage medium. In addition, instead of the form in which the program is recorded on the tangible non-transitory information storage medium to be provided, it is also possible to provide a program signal as a download service using a communication network, such as the Internet.

Advantages of Embodiment

[1] According to the ink jet printing apparatus 1 according to the embodiment, the two-liquid coagulation system and the one-liquid coagulation system are automatically switched according to the switching between the standard mode and the high-speed mode, so that one apparatus can be used for two applications, high image quality printing and high productivity printing. That is, while the ink jet printing apparatus 1 enables the high image quality printing in the standard mode (two-liquid coagulation system), the ink jet printing apparatus 1 enables high-speed transportation in the high-speed mode by being switched to the one-liquid coagulation system, thereby enabling the high-productivity printing.

[2] In the high-speed mode, the drying intensity is automatically changed to the table conforming to the high-speed mode to increase the drying intensity to be higher than that in the standard mode. Therefore, insufficient drying due to the high-speed transportation is solved.

Modification Example 1

In the above-described embodiment, the ink jet printing apparatus 1 using the page-wide full-line head has been described. However, the scope of application of the present invention is not limited thereto, and the present invention can be applied to an ink jet printing apparatus that forms an image by performing head scanning a plurality of times while moving a short recording head, such as a serial head.

Modification Example 2

In the above-described embodiment, the example in which the aqueous ink is used has been described. However, an ultraviolet curable ink may be used instead of the aqueous ink. In a case where the ultraviolet curable ink is used, the ink jet printing apparatus 1 is provided with an ultraviolet irradiation device in place of or in addition to the heat-drying treatment unit 90.

<<Jetting Method of Ink Jet Head>>

The ejector of the ink jet head is configured to include the nozzle from which the ink is jetted, the pressure chamber communicating with the nozzle, and a jetting energy generating element for applying jetting energy to a liquid in the pressure chamber. Regarding a jetting method for jetting droplets from the nozzle of the ejector, a unit for generating the jetting energy is not limited to the piezoelectric element, and various jetting energy generating elements, such as a heat generating element and an electrostatic actuator, can be applied. For example, it is possible to adopt a method of jetting droplets by utilizing a pressure during film boiling due to heating of the liquid by the heat generating element. A jetting energy generating element corresponding to the jetting method of the ink jet head is provided in a flow path structure.

<<Recording Medium>>

In the above-described embodiment, an example in which the paper P, which is sheet-fed paper, is used as the recording medium has been described. However, the medium used for recording an image is not limited to the sheet-fed medium, and may also be a continuous form medium such as continuous form paper. In addition, the sheet-fed medium is not limited to cut paper prepared in a predetermined size in advance, and may also be obtained by cutting a continuous form medium into a predetermined size at any time.

The term "recording medium" is a general term for various terms such as paper, recording paper, printing paper, a printing medium, a print medium, a printed medium, an image forming medium, an image-formed medium, an image receiving medium, and a jetted medium. A material and a shape of the medium are not particularly limited, and seal paper, a resin sheet, a film, cloth, non-woven fabric, and other various sheet bodies can be used regardless of material or shape.

<<Transport Mechanism of Recording Medium>>

The transport mechanism that transports the recording medium is not limited to a drum transport method illustrated in FIG. 1, and various forms such as a belt transport method, a nip transport method, a chain transport method, and a pallet transport method can be adopted, and these methods can be appropriately combined.

Terms

The term "printing apparatus" is synonymous with terms such as a printing machine, a printer, a print apparatus, an image recording apparatus, an image forming apparatus, an image output apparatus, or a drawing apparatus.

The term "image" is to be construed in a broad sense, and includes a color image, a black-and-white image, a monochromatic image, a gradation image, a uniform density (solid) image, and the like. The term "image" is not limited to a photographic image, and is used as a comprehensive term including a pattern, text, symbols, line drawings, a mosaic pattern, a color fill pattern, various other patterns, or an appropriate combination thereof.

The term "printing" includes the concepts of terms such as recording of an image, forming of an image, printing, drawing, and print. The term "drawing" includes the concepts of terms such as image recording, image formation, and digital printing based on digital data.

Combination of Embodiments and Modification Examples

Items described in the configurations described in the above-described embodiment and the modification examples can be used in combination as appropriate, or some items can be substituted.

In the embodiment of the present invention described above, configuration requirements can be appropriately changed, added, or deleted without departing from the gist of the present invention. The present invention is not limited to the embodiment described above, and many modifications can be made by those having ordinary knowledge in the equivalent related fields within the technical idea of the present invention.

EXPLANATION OF REFERENCES

1: ink jet printing apparatus
10: feeding unit

11: transport mechanism
12: feeding device
12A: feeding tray
14: feeder board
16: feeding drum
20: treatment liquid applying unit
22: treatment liquid coating drum
23: gripper
24: treatment liquid coating device
25: coating roller
30: treatment liquid drying unit
32: treatment liquid drying drum
33: gripper
34: hot air blower
40: drawing unit
42: drawing drum
43: gripper
44: head unit
46: ink jet head
46C: ink jet head
46M: ink jet head
46Y: ink jet head
46K: ink jet head
48: image reading device
50: ink drying unit
60: accumulation unit
62: accumulation device
62A: accumulation tray
70: chain gripper
71A: first sprocket
71B: second sprocket
72: chain
74: gripper
80: paper guide
82: first paper guide
84: second paper guide
90: heat-drying treatment unit
102: adsorption transport device
110: belt
110A: transport surface
112: driving roller
114: driven roller
116: suction box
162: infrared lamp
164: infrared lamp
212: head module
212A: nozzle surface
214: base frame
218B: module support member
218D: head protection member
220: nozzle
222: ejector
224: individual supply path
224A: nozzle row
226: supply-side common flow path
250: pressure chamber
252: piezoelectric element
254: nozzle flow path
256: vibration plate
258: individual electrode
260: piezoelectric body
266: cover plate
268: movable space
280: recovery-side common flow path
282: individual recovery path
300: processor
302: storage device
304: communication unit
306: input device
308: display device
310: system control unit
311: image processing unit
312: transport control unit
313: feeding control unit
314: treatment liquid application control unit
316: treatment liquid drying control unit
318: drawing control unit
320: ink drying control unit
324: paper output control unit
332: image memory
334: parameter storage unit
336: program storage unit
400: host computer
P: paper
S11 to S34: steps of processing in the ink jet printing apparatus

What is claimed is:

1. An image forming apparatus comprising:

a transport mechanism that transports a recording medium;

a coating device that coats the recording medium with a pretreatment liquid;

an ink jet head that jets an ink; and a processor that controls a transportation speed of the recording medium and a coating operation by the coating device in a case where an image is formed on the recording medium by jetting the ink from the ink jet head, wherein the processor is configured to:

in a case where the recording medium is transported at a first transportation speed to form the image on the recording medium, perform control to cause the coating device to perform coating with the pretreatment liquid, in a case where the recording medium, which is the same type of recording medium as that transported at the first transportation speed, is transported at a second transportation speed faster than the first transportation speed to form the image on the recording medium, perform control to cause the coating device not to perform coating with the pretreatment liquid, and form, on the recording medium transported at the second transportation speed, an image lower in print image quality than the image to be formed on the recording medium transported at the first transportation speed.

2. The image forming apparatus according to claim 1, wherein the processor is configured to:

receive an input of an instruction to switch between a first mode in which the recording medium is transported at the first transportation speed and a second mode in which the recording medium is transported at the second transportation speed; and perform control such that coating with the pretreatment liquid is performed in a case where the first mode is designated and perform control such that coating with the pretreatment liquid is not performed in a case where the second mode is designated.

3. The image forming apparatus according to claim 1, further comprising:

a drying device that dries the ink adhered to the recording medium, wherein the processor is configured to control the drying device to a first drying intensity in the case where the recording medium is transported at the first transportation speed, and control the drying device to a second drying intensity higher than the first drying intensity in the case where the recording medium is transported at the second transportation speed.

4. The image forming apparatus according to claim 3, wherein the processor is configured to set a drying intensity of the drying device according to a thickness of the recording medium.

5. The image forming apparatus according to claim 4, wherein the processor is configured to set the drying device to a higher temperature as the thickness of the recording medium increases.

6. The image forming apparatus according to claim 3, wherein the processor is configured to set a drying intensity of the drying device according to a type of the recording medium.

7. The image forming apparatus according to claim 3, wherein the processor is configured to set a drying intensity of the drying device based on a content of the image formed on the recording medium.

8. The image forming apparatus according to claim 3, further comprising:

an input device via which a drying condition of the drying device is designated, wherein the processor is configured to control the drying device according to the drying condition input via the input device.

9. The image forming apparatus according to claim 1, wherein the processor is configured to:

in the case where the recording medium is transported at the first transportation speed, cause the ink jet head to form the image on the recording medium at a first printing resolution; and in the case where the recording medium is transported at the second transportation speed, cause the ink jet head to form the image on the recording medium at a second printing resolution lower than the first printing resolution.

10. The image forming apparatus according to claim 1, wherein the processor is configured to:

in the case where the recording medium is transported at the first transportation speed to form the image, set a maximum jetted ink droplet volume per dot of the ink jetted from a nozzle of the ink jet head to a first droplet volume; and in the case where the recording medium is transported at the second transportation speed to form the image, set the maximum jetted ink droplet volume to a second droplet volume smaller than the first droplet volume.

11. The image forming apparatus according to claim 1, wherein the coating device includes a coating roller that transfers the pretreatment liquid onto the recording medium, and the coating roller is brought into a state of being separated from the recording medium so that coating with the pretreatment liquid is not performed.

12. The image forming apparatus according to claim 1, wherein the pretreatment liquid contains an acid.

13. The image forming apparatus according to claim 1, wherein the pretreatment liquid contains at least one of a polyvalent metal salt or a cationic polymer.

14. The image forming apparatus according to claim 1, wherein the ink jet head is a line head.

15. The image forming apparatus according to claim 1, wherein the same ink is used in the case where the recording medium is transported at the first transportation speed to form the image on the recording medium and in the case where the recording medium is transported at the second transportation speed to form the image on the recording medium.

16. The image forming apparatus according to claim 1, wherein the second transportation speed is 1.5 times or more the first transportation speed.

17. A method of manufacturing a printed material using an image forming apparatus including a transport mechanism that transports a recording medium, a coating device that coats the recording medium with a pretreatment liquid, an ink jet head that jets an ink, and a processor that controls a transportation speed of the recording medium and a coating operation by the coating device in a case where an image is formed on the recording medium by jetting the ink from the ink jet head, the method comprising:

receiving an input of an instruction to change the transportation speed by the processor;

in a case in which a first transportation speed is designated as the transportation speed, transporting the recording medium at the first transportation speed by the transport mechanism, coating the recording medium with the pretreatment liquid by the coating device, and allowing the ink jetted from the ink jet head to adhere to the recording medium coated with the pretreatment liquid to form the image on the recording medium;

in a case where a second transportation speed higher than the first transportation speed is designated as the transportation speed, transporting the recording medium, which is the same type of recording medium as that transported at the first transportation speed, at the second transportation speed by the transport mechanism, not coating the recording medium with the pretreatment liquid by the coating device, and allowing the ink jetted from the ink jet head to adhere to the recording medium not coated with the pretreatment liquid to form the image on the recording medium; and forming, on the recording medium transported at the second transportation speed, an image lower in print image quality than the image to be formed on the recording medium transported at the first transportation speed.

18. The method of manufacturing the printed material according to claim 17, wherein the recording medium is a woodfree paper, an art paper, or a coated paper.

19. The image forming apparatus according to claim 1, wherein the coating device is included in a treatment liquid applying unit, and the treatment liquid applying unit further includes a treatment liquid coating drum for receiving the recording medium to be coated by the coating device.

* * * * *